US010325518B2

(12) United States Patent
Nakayama

(10) Patent No.: US 10,325,518 B2
(45) Date of Patent: Jun. 18, 2019

(54) TRAVELING-STATE DISPLAY DEVICE AND TRAVELING-STATE DISPLAY METHOD

(71) Applicant: FUJITSU LIMITED, Kawasaki-shi, Kanagawa (JP)

(72) Inventor: Osafumi Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 105 days.

(21) Appl. No.: 15/157,681

(22) Filed: May 18, 2016

(65) Prior Publication Data

US 2017/0032688 A1 Feb. 2, 2017

(30) Foreign Application Priority Data

Jul. 30, 2015 (JP) ................................ 2015-151016

(51) Int. Cl.

| | |
|---|---|
| ***G06T 11/60*** | (2006.01) |
| ***G06T 7/00*** | (2017.01) |
| ***G06T 7/20*** | (2017.01) |
| ***G09B 19/16*** | (2006.01) |
| ***G09B 5/06*** | (2006.01) |
| ***G06T 7/73*** | (2017.01) |

(Continued)

(52) U.S. Cl.

CPC ............ *G09B 19/167* (2013.01); *G06T 7/246* (2017.01); *G06T 7/73* (2017.01); *G06T 11/60* (2013.01); *G09B 9/042* (2013.01); *G06T 2207/10016* (2013.01); *G06T 2207/20221* (2013.01); *G06T 2207/30241* (2013.01); *G06T 2207/30256* (2013.01)

(58) Field of Classification Search

CPC ........... G06T 11/60; G06T 2207/10016; G06T 2207/20221; G06T 2207/30241; G06T 2207/30256; G06T 7/246; G06T 7/73; G09B 19/167; G09B 9/042

See application file for complete search history.

(56) References Cited

U.S. PATENT DOCUMENTS

| | | | | |
|---|---|---|---|---|
| 6,366,851 B1 * | 4/2002 | Chojnacki | .............. | G01C 21/32 701/467 |
| 2007/0276599 A1 * | 11/2007 | Ogawa | ................ | G06K 9/4604 382/181 |

(Continued)

FOREIGN PATENT DOCUMENTS

| | | | |
|---|---|---|---|
| JP | 61-281910 | | 12/1986 |
| JP | 2009-199328 | * | 3/2009 |
| JP | 2009-199328 | | 9/2009 |

(Continued)

OTHER PUBLICATIONS

IIHS, (Youtube video: "Lane departure warning and prevention," https://www.youtube.com/watch?v=xdX6J5KQXS0), Published on Jul. 2, 2012. (Year: 2012).*

*Primary Examiner* — Sing-Wai Wu
(74) *Attorney, Agent, or Firm* — Fujitsu Patent Center

(57) ABSTRACT

A computer detects a virtual central line of a traveling lane from a road-captured image captured from a vehicle. Next, the computer displays a transformed image generated by transforming the road-captured image such that the detected virtual central line is situated in a prescribed position. At this point, the computer moves a display position of a symbol indicating the vehicle on the generated transformed image according to a result of detecting a traveling position of the vehicle in the traveling lane.

13 Claims, 24 Drawing Sheets

START

201 DETECT VIRTUAL CENTRAL LINE

202 DISPLAY TRANSFORMED IMAGE

END

(51) Int. Cl.
*G06T 7/246* (2017.01)
*G09B 9/042* (2006.01)

(56) References Cited

U.S. PATENT DOCUMENTS

2012/0314055 A1* 12/2012 Kataoka ................. G08G 1/167
348/117
2015/0187224 A1* 7/2015 Moncrief .............. G09B 9/052
434/30

FOREIGN PATENT DOCUMENTS

JP 2013-117811 6/2013
JP 2014-6576 1/2014

* cited by examiner

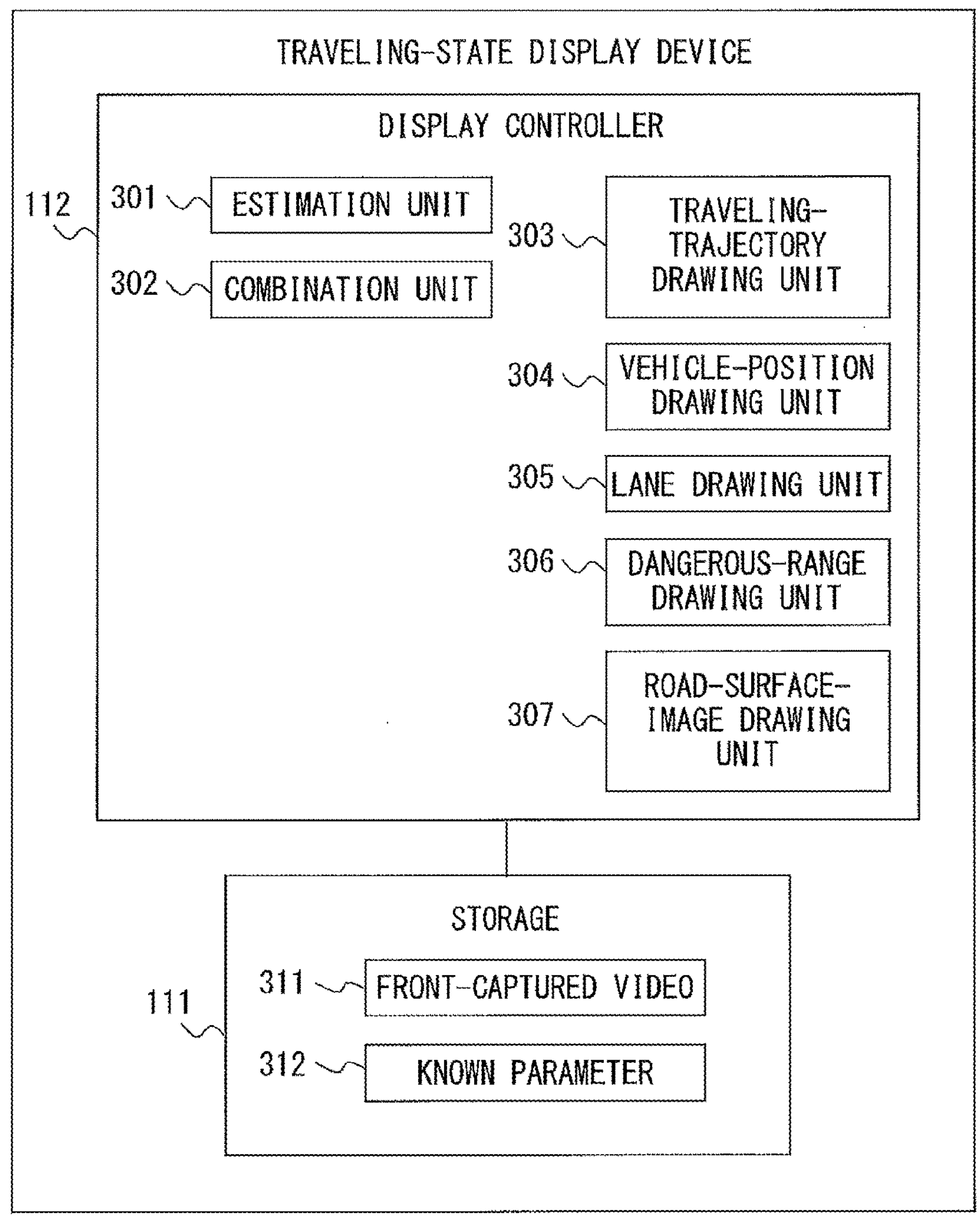
F I G. 3

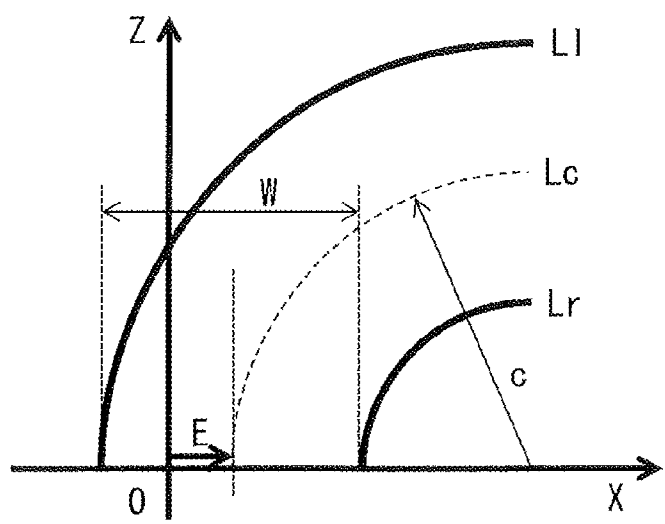
F I G. 4

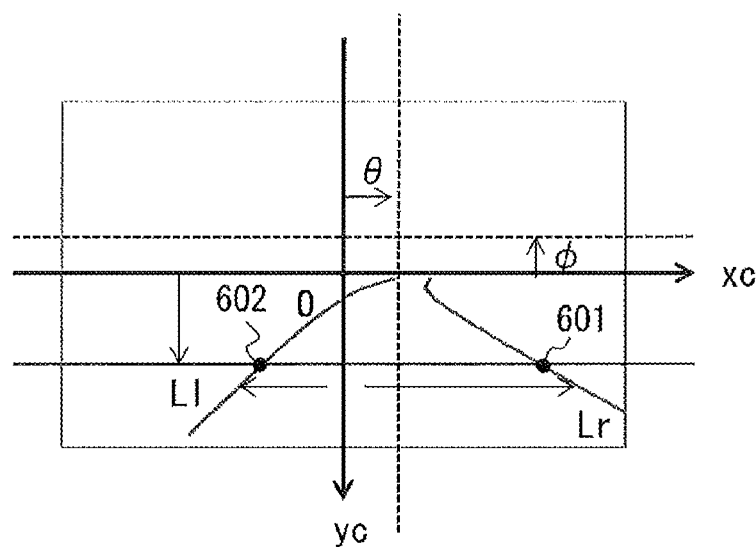
F I G. 6

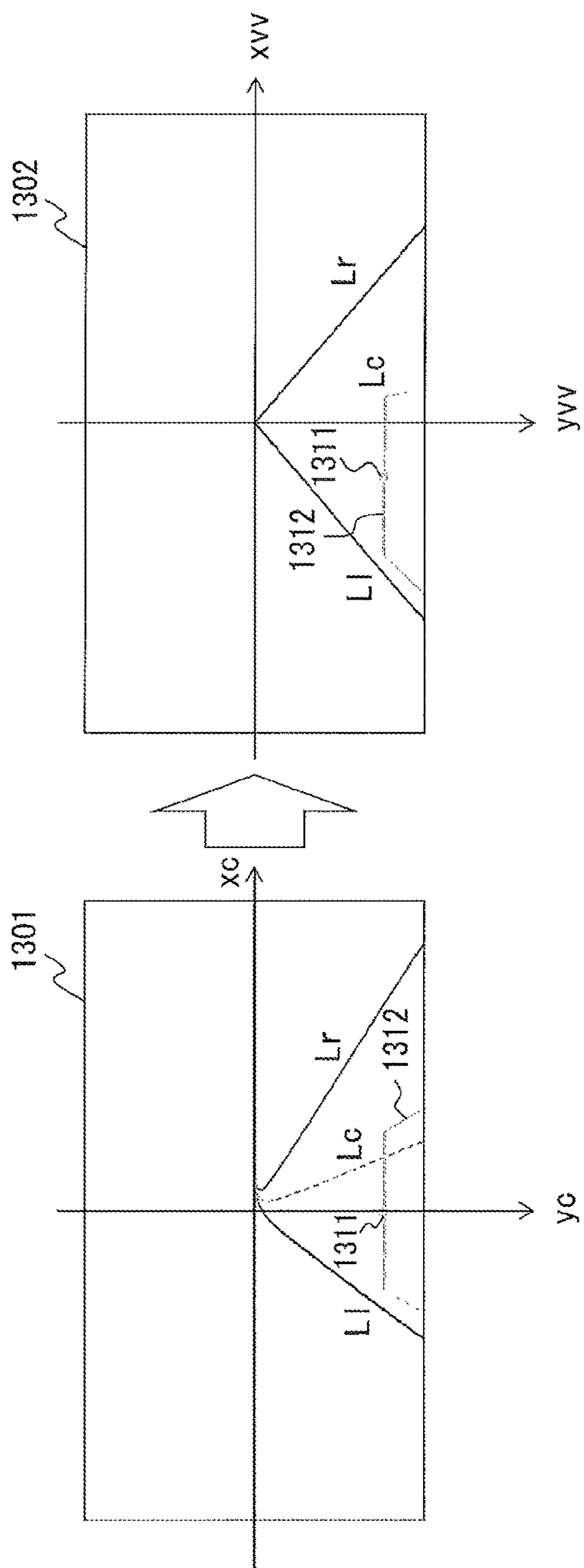
F I G. 1 3

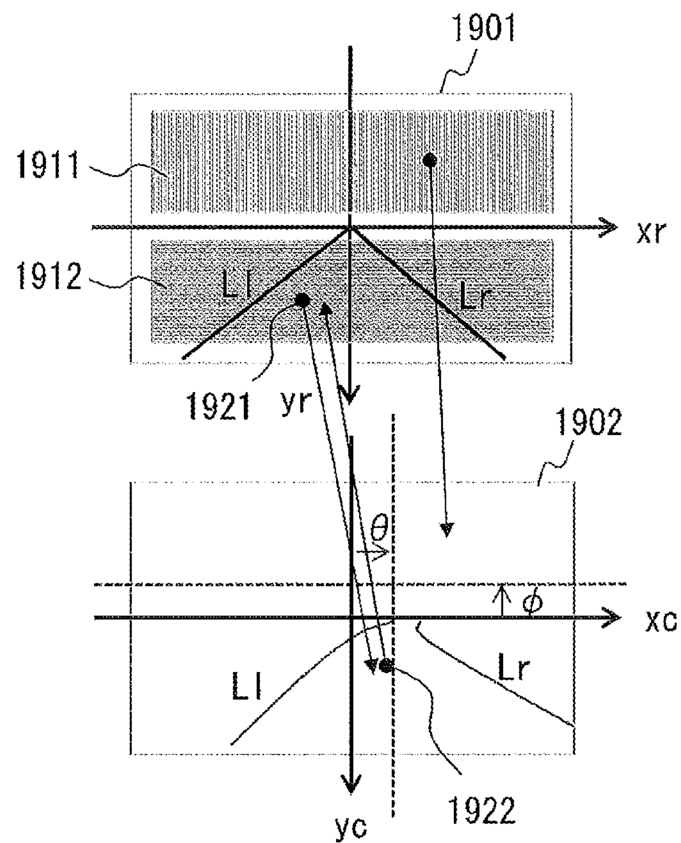
F I G. 1 9

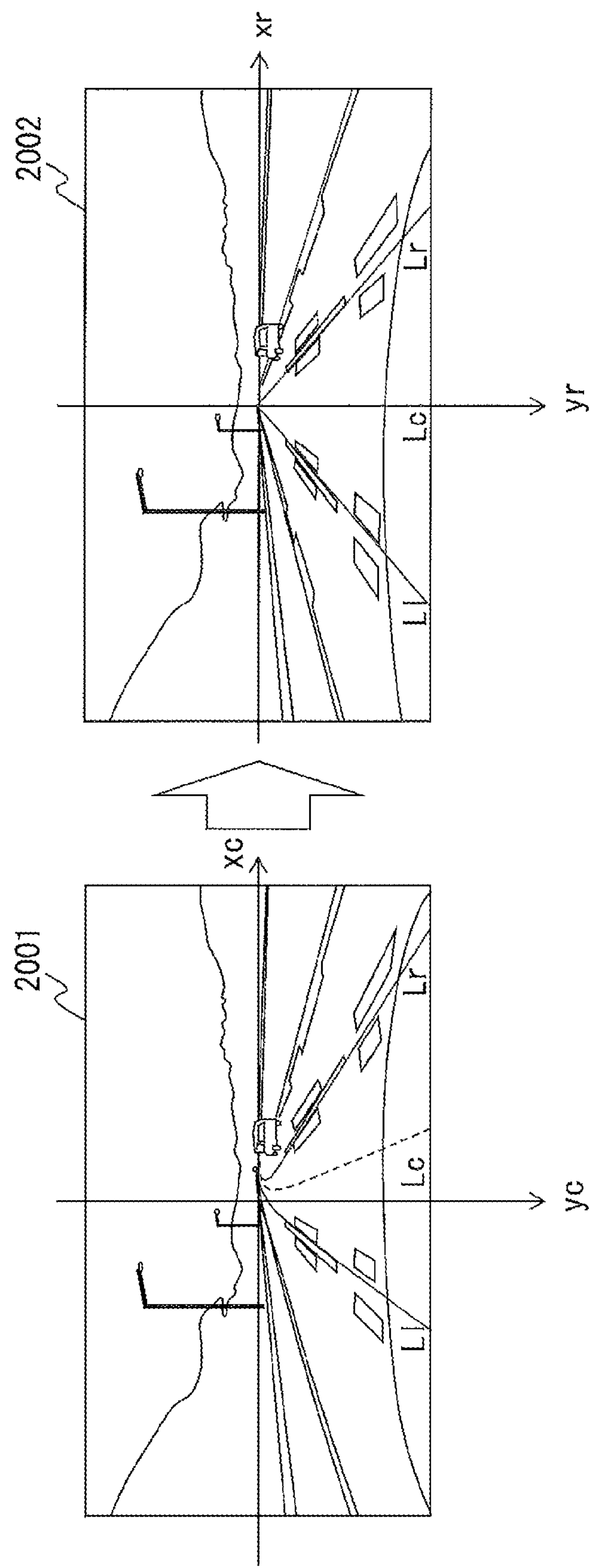
F I G. 2 0

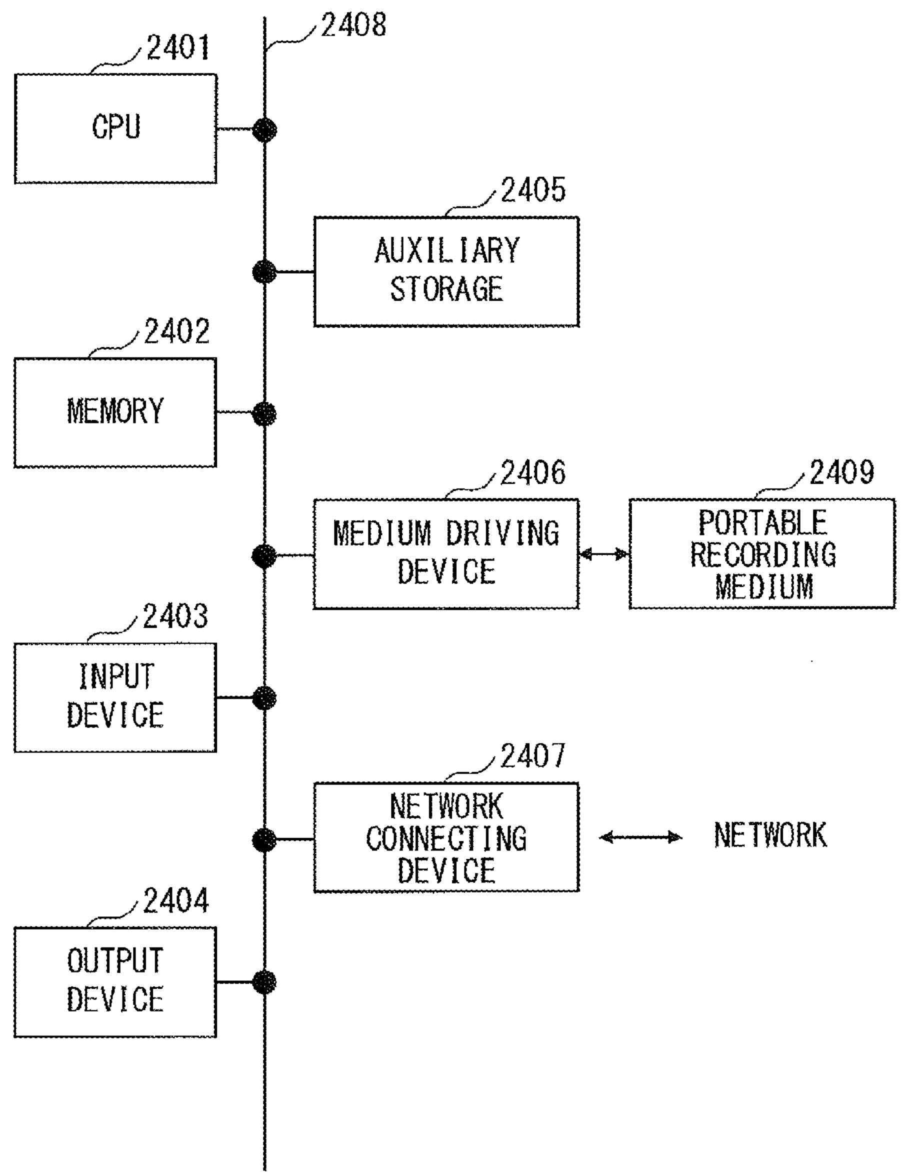
F I G. 2 4

TRAVELING-STATE DISPLAY DEVICE AND TRAVELING-STATE DISPLAY METHOD

CROSS-REFERENCE TO RELATED APPLICATION

This application is based upon and claims the benefit of priority of the prior Japanese Patent Application No. 2015-151016, filed on Jul. 30, 2015, the entire contents of which are incorporated herein by reference.

FIELD

The embodiments discussed herein are related to a traveling-state display device and a traveling-state display method.

BACKGROUND

In transportation services, a safe driving education for drivers is provided by a safety management officer as part of the services, and educational effects can be enhanced by visualizing an actual driving state of a driver effectively. In order to ensure safety in the transportation services, preferably, a vehicle travels stably within a lane (traveling lane) that is created by sectioning a road with lane markings.

With respect to a visualization of a driving state, a technology that obtains a driving state or a road geometry on the basis of an image captured from a vehicle is known (see, for example, Patent Documents 1 to 3). Further, a technology that displays, according to an image captured of a moving sign, a trajectory of a change in the position of the sign is also known (see, for example, Patent Document 4).

Patent Document 1: Japanese Laid-open Patent Publication No. 2009-199328

Patent Document 2: Japanese Laid-open Patent Publication No. 2013-117811

Patent Document 3: Japanese Laid-open Patent Publication No. 2014-6576

Patent Document 4: Japanese Laid-open Patent Publication No. 61-281910

SUMMARY

According to an aspect of the embodiments, a non-transitory computer-readable recording medium stores therein a traveling-state display program causing a computer to execute a process including the followings.

(1) The computer detects a virtual central line of a traveling lane from a road-captured image captured from a vehicle.

(2) The computer displays a transformed image generated by transforming the road-captured image such that the detected virtual central line is situated in a prescribed position, and moves a display position of a symbol indicating the vehicle on the generated transformed image according to a result of detecting a traveling position of the vehicle in the traveling lane.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram that illustrates a specific example of the functional configuration of the traveling-state display device;

FIG. 4 illustrates a road geometry model;

FIG. 6 illustrates a road-captured image;

FIG. 13 illustrates a vehicle position image;

FIG. 19 illustrates road-image drawing processing;

FIG. 20 illustrates a transformed image;

FIG. 24 is a diagram that illustrates a configuration of an information processing device.

DESCRIPTION OF EMBODIMENTS

Embodiments of the present invention will now be described in detail with reference to the drawings.

It is conceivable that, in a safe driving education that uses traveling data obtained by use of, for example, a drive recorder, how a vehicle traveled within a traveling lane is presented. In this case, preferably, an actual wobble state of a vehicle while traveling, such as a deviation from a traveling lane or not a deviation but a dangerous wobble, is presented to a driver such that it can be easily confirmed visually.

When a road video captured by an onboard camera is recorded in a drive recorder, it is possible to present relative positions of lane markings and a vehicle by displaying a symbol indicating the vehicle superimposed over the road video. However, in a video of an onboard camera, a position of a vehicle is not temporally changed, and a road surface that occupies a majority of a vehicle-forward portion moves with a rotation from side to side. Thus, a left/right rocking of the road surface can be visually confirmed, but it is difficult to recognize the left/right rocking of the road surface as a left/right rocking of the vehicle due to steering.

Figure 1:
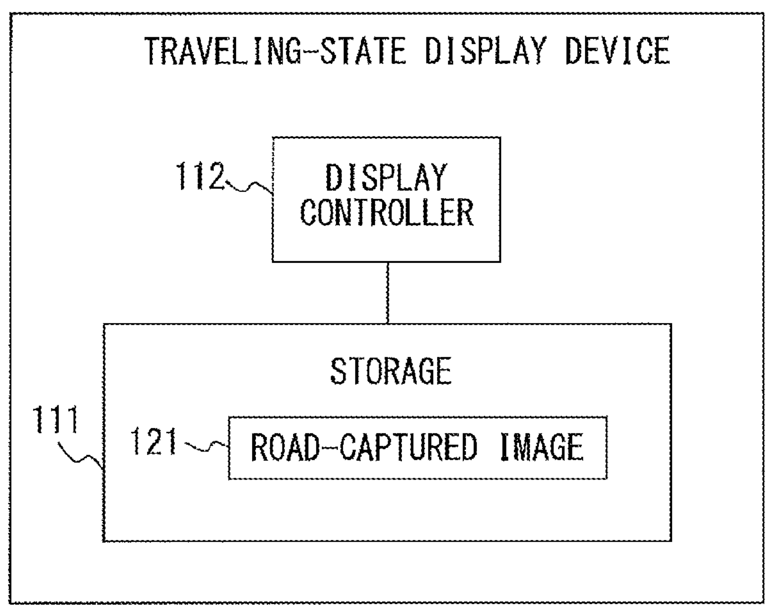
FIG. 1 is a diagram that illustrates a functional configuration of a traveling-state display device.

FIG. 1 illustrates an example of a functional configuration of a traveling-state display device according to an embodiment. A traveling-state display device 101 of FIG. 1 includes a storage 111 and a display controller 112. The storage 111 stores therein a road-captured image 121 captured from a vehicle, and the display controller 112 performs processing of displaying an image including a symbol indicating the vehicle using the road-captured image 121.

Figure 2:
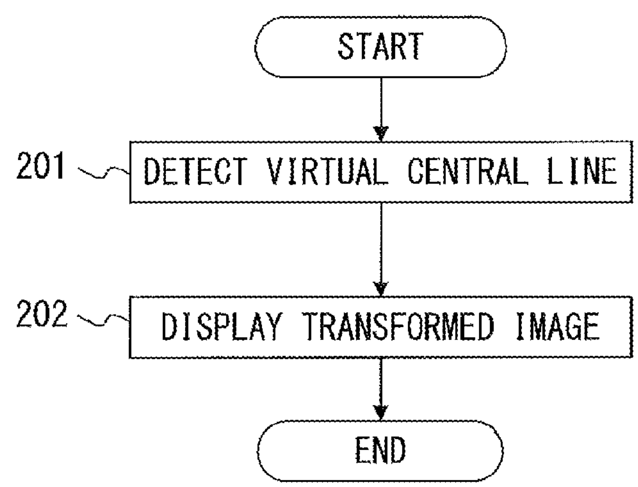
FIG. 2 is a flowchart of traveling-state display processing.

FIG. 2 is a flowchart that illustrates an example of traveling-state display processing performed by the traveling-state display device 101 of FIG. 1. First, the display controller 112 detects a virtual central line of a traveling lane from the road-captured image 121 stored in the storage 111 (Step 201).

Next, the display controller 112 displays a transformed image generated by transforming the road-captured image 121 such that the detected virtual central line is situated in a prescribed position (Step 202). At this point, according to a result of detecting a traveling position in the traveling lane of the vehicle, the display controller 112 moves a display position of the symbol indicating the vehicle on the generated transformed image.

According to the traveling-state display device 101 of FIG. 1, it is possible to clearly display a wobble state of a vehicle while traveling.

FIG. 3 illustrates a specific example of the traveling-state display device 101 of FIG. 1. In the traveling-state display device 101 of FIG. 3, the display controller 112 includes an estimation unit 301, a combination unit 302, a traveling-trajectory drawing unit 303, a vehicle-position drawing unit 304, a lane drawing unit 305, a dangerous-range drawing unit 306, and a road-surface-image drawing unit 307. The storage 111 stores therein a front-captured video 311 and a known parameter 312.

The front-captured video 311 is a moving image of the forward direction of the travel of a vehicle that is captured by an onboard camera, and includes road-captured images (image frames) at a plurality of times. The front-captured video 311 is captured and stored in the storage 111 in advance. When the front-captured video 311 is a video of a drive recorder, the video is captured by a wide-angle lens. The known parameter 312 is a known parameter that is common to the road-captured images at the plurality of times.

The estimation unit 301 estimates a road geometry parameter of an image frame at each time using the front-captured video 311 and the known parameter 312. The display controller 112 fixes a virtual viewpoint on a virtual central line of a traveling lane and makes a road straight by correcting a road curvature, so as to transform each image frame into a virtual transformed image.

The traveling-trajectory drawing unit 303 compresses a display range of a traveling trajectory of the vehicle in its traveling direction (in a direction of a depth of an image frame), so as to generate a traveling trajectory image that represents positions of the vehicle after a specific image frame. The vehicle-position drawing unit 304 generates a vehicle position image that represents a shape of the vehicle as viewed from the virtual viewpoint.

The lane drawing unit 305 generates a lane image that represents a lane marking such as a white line indicating a boundary (an end) of the traveling lane. The dangerous-range drawing unit 306 classifies, according to a distance from the end of the traveling lane, areas within the traveling lane into a plurality of areas that have different degrees of risk, and generates a dangerous range image in which these areas are indicated. The road-surface-image drawing unit 307 transforms each image frame into a transformed image.

The combination unit 302 combines a traveling trajectory image, a vehicle position image, a lane image, a dangerous range image, and a transformed image so as to generate a combined image, and displays the generated combined image on a display.

The movement of a road surface that occupies a majority of a front-captured video can be stopped by fixing a virtual viewpoint on a virtual central line of a traveling lane and by making a road straight. Then, an image in which only a vehicle traveling rocks from side to side can be displayed on the road surface by combining a vehicle position image and a transformed image and by displaying a combined image, which permits a direct visual confirmation of the left/right rocking of the vehicle due to steering. Further, a movement trajectory of the vehicle can be displayed on the road surface over a long distance by combining a traveling trajectory image with the combined image and displaying a newly combined image, which results in emphasizing the left/right rocking of the vehicle.

FIG. 4 illustrates an example of a road geometry model. In this case, consider a road geometry model in which a road width (a lane width) is W when measurement is performed at each position of a traveling lane in a horizontal direction (in an x-axis direction), wherein a curvature of a virtual central line Lc of the traveling lane is c.

Figure 5:
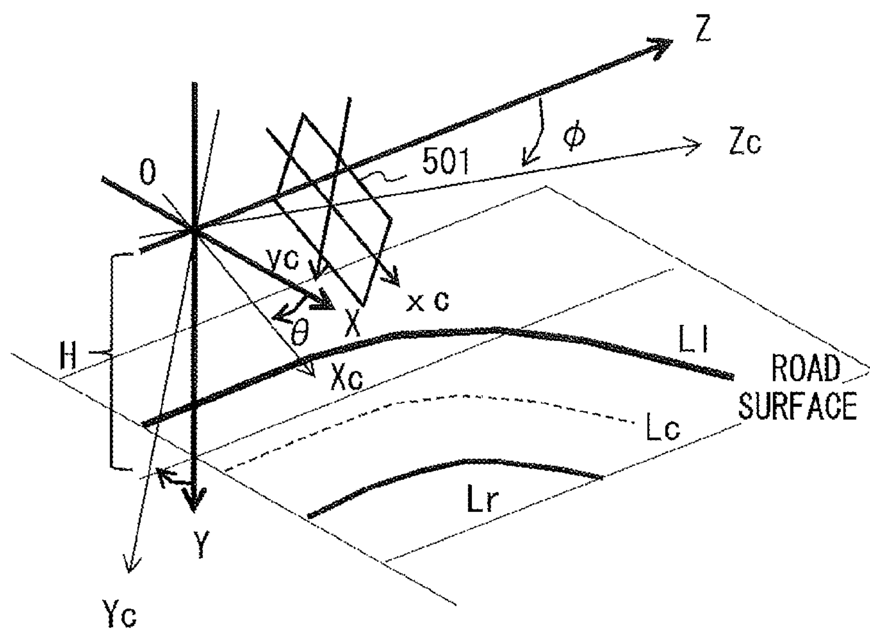
FIG. 5 illustrates a model of an observation system of a camera.

As illustrated in FIG. 5, setting a center of a camera to be an origin O, a road-surface coordinate system has its X-axis in a lateral direction from the origin O and its Z-axis in a longitudinal direction. Here, the Z-axis indicates a direction of a depth of a road, and a direction perpendicular to an XZ-plane is a Y-axis of the road-surface coordinate system. Each symbol in the road geometry model of FIG. 4 refers to as follows:

Lc: Virtual central line of a traveling lane

Lr: Lane marking on the right side of the traveling lane

Ll: Lane marking on the left side of the traveling lane

W: Road width c: Road curvature

E: Distance from the origin O to the virtual central line Lc (offset in a lateral direction of the camera)

FIG. 5 illustrates an example of a model of an observation system of the camera. The center of the camera is located at a height H from a road surface, and a camera coordinate system O-XcYcZc has slopes that respectively have a yaw angle θ, a pitch angle ϕ, and a roll angle 0 with respect to the road-surface coordinate system O-XYZ. A focal length of the camera in a horizontal direction is fx, and its focal length in a vertical direction is fy. An image-capturing surface 501 of the camera is represented using an image coordinate system O-xcyc.

FIG. 6 illustrates an example of a road-captured image (an image frame) that is captured by the camera. A center of the image frame is set to be an origin O, an xc-axis is set rightward from the origin O and a yc-axis is set downward, and (xc,yc) is set to be an image coordinate. Here, using the approximation described in Patent Document 2, an xc-coordinate of the lane marking Lr or the lane marking Ll with respect to a prescribed yc-coordinate can be represented by the following formula:

$$xc = \frac{c \cdot fx \cdot fy \cdot H}{2(fy \cdot \varphi + yc)} + \left(E + k\frac{W}{2}\right)\frac{fx(fy \cdot \varphi + yc)}{fy \cdot H} + fx \cdot \theta \tag{1}$$

k in Formula (1) is a constant for distinguishing between the lane marking Lr and the lane marking Ll. k=1 for a point 601 on the lane marking Lr on the right side, and k=−1 for a point 602 on the lane marking Ll on the left side.

If a coordinate (xc,yc) of a lane marking can be detected from an image frame at each time, road geometry parameters (W,E,c,ϕ,θ) can be estimated using Formula (1). In this case, the known parameter 312 includes, for example, the following parameters:

H: Height of camera setting

Px: Distance from a camera origin to a vehicle center fx: Focal length of the camera in a horizontal direction fy: Focal length of the camera in a vertical direction pw: Number of pixels of an image frame in a horizontal direction ph: Number of pixels of the image frame in a vertical direction It is assumed that a mounting orientation of the camera with respect to the vehicle (the yaw angle, the pitch angle, and the roll angle) is known, and that initial values of the yaw angle, the pitch angle, and the roll angle are zero in the front-captured video 311, or the front-captured video 311 is corrected such that the center of the image frame is consistent with a point at infinity on a road ahead without any effect of a shift of the orientation. Further, it is assumed that the front-captured video 311 is a video that has been transformed perspectively.

The estimation unit 301 can estimate, from an image frame at a time t, the following road geometry parameters using Formula (1):

W(t): Road width

Figure 7:
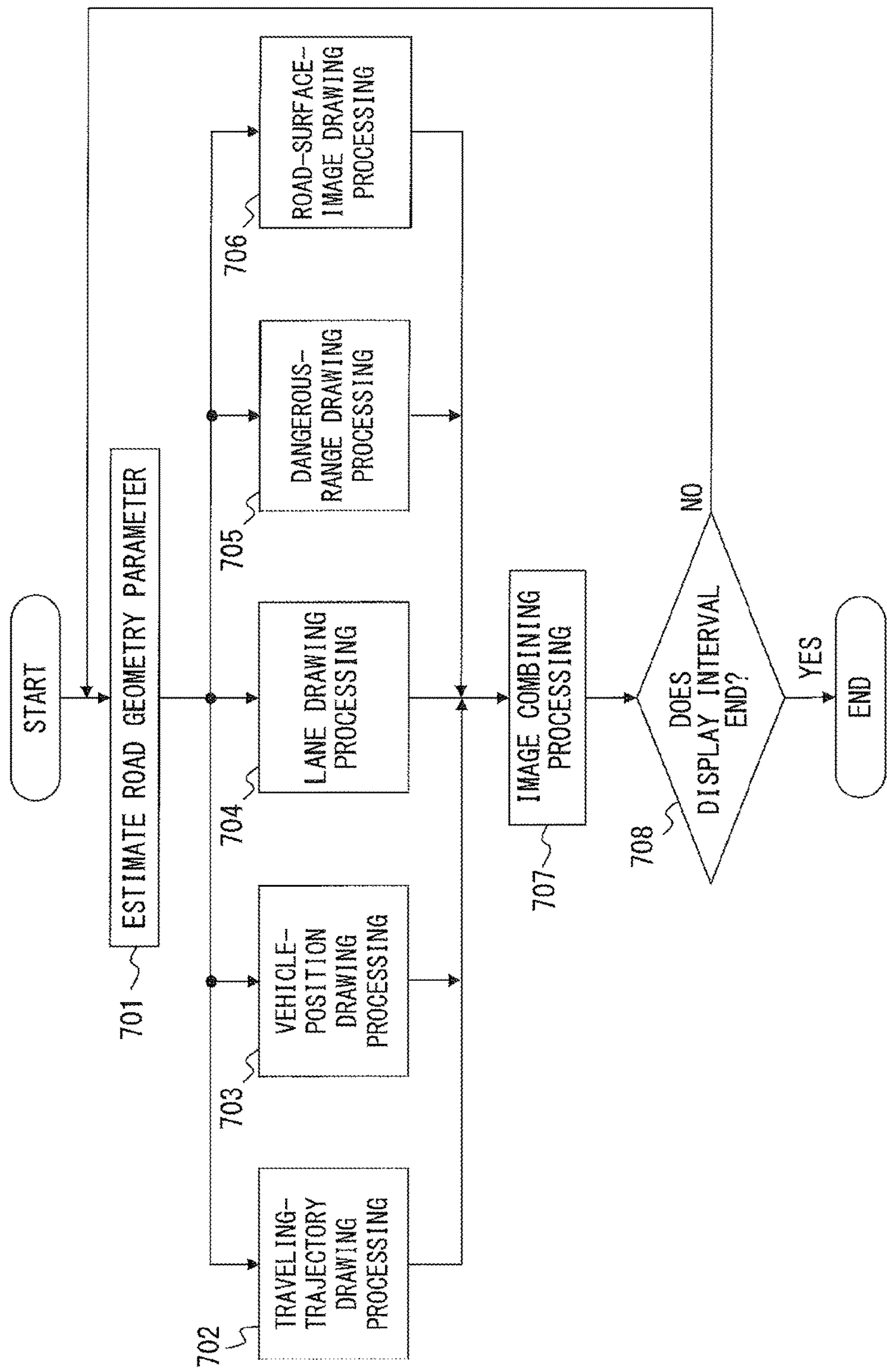
FIG. 7 is a flowchart that illustrates a specific example of traveling-state display processing.

E(t): Lateral distance from the camera origin to a road center c(t): Road curvature φ(t): Pitch angle θ(t): Yaw angle FIG. 7 is a flowchart that illustrates a specific example of traveling-state display processing performed by the traveling-state display device 101 of FIG. 3. First, the estimation unit 301 estimates, from an image frame at a start time of a display interval, a road geometry parameter using Formula (1) (Step 701).

Next, the traveling-trajectory drawing unit 303 performs traveling-trajectory drawing processing so as to generate a traveling trajectory image (Step 702), and the vehicle-position drawing unit 304 performs vehicle-position drawing processing so as to generate a vehicle position image (Step 703). The lane drawing unit 305 performs lane drawing processing so as to generate a lane image (Step 704), and the dangerous-range drawing unit 306 performs dangerous-range drawing processing so as to generate a dangerous range image (Step 705). The road-surface-image drawing unit 307 performs road-surface-image drawing processing so as to generate a transformed image (Step 706). The display controller 112 may perform the processes of Step 702 to Step 706 in parallel or in a prescribed order.

Next, the combination unit 302 performs image combining processing so as to generate a combined image, and displays the generated combined image on a screen (Step 707).

Then, the display controller 112 determines whether an end time of the display interval has been reached (Step 708), and when the end time of the display interval has not been reached (Step 708, NO), the display controller 112 repeats the processes of and after Step 701 for a next time. When the end time of the display interval has been reached (Step 708, YES), the display controller 112 terminates the processing.

Figure 8:
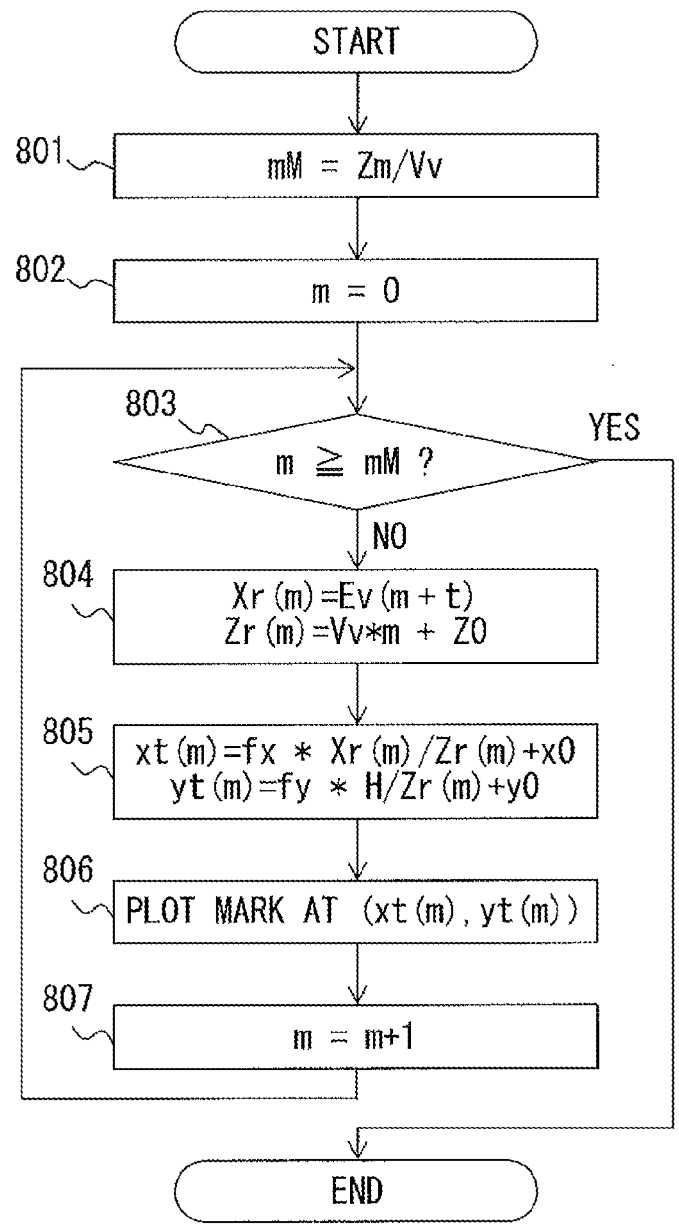
FIG. 8 is a flowchart of traveling-trajectory drawing processing.

FIG. 8 is a flowchart that illustrates an example of the traveling-trajectory drawing processing in Step 702 of FIG. 7. A lateral distance Er(t) at the time t from a road center to a camera origin is obtained using the following formula by use of E(t) at the time t:

$$Er(t)=-E(t) \quad (2)$$

Here, a lateral distance Ev(t) from the road center to a vehicle center is obtained using the following formula by use of Er(t):

$$Ev(t)=Er(t)+Px=-E(t)+Px \quad (3)$$

In order to compress a traveling trajectory in a traveling direction, a traveling velocity of the vehicle Vr(mm/frame) is changed to a virtual traveling velocity Vv(mm/frame) that is sufficiently slow.

$$Vv=Vr/K \quad (4)$$

K represents a deceleration factor, and it may be, for example, a value that is about 160. When the traveling trajectory is displayed by use of a position of the vehicle center at a time t' that is after the time t, a relative time m of the time t' with respect to the time t can be represented by the following formula:

$$m=t'-t \quad (5)$$

When a road curvature c(t) is ignored in order to make the road straight, a coordinate (Xr(m),Zr(m)) of the vehicle center at the relative time m in a road-center coordinate system having its Zr-axis in a road center is obtained using the following formulas:

$$Xr(m)=Ev(m+t) \quad (6)$$

$$Zr(m)=Vv*m+Z0 \quad (7)$$

The depth distance Z0 represents a Zr coordinate of the vehicle center at the time t, and it may be, for example, a value that is about 2800 mm.

In the traveling-trajectory drawing processing of FIG. 8, a traveling trajectory image is generated using Formula (6) and Formula (7). As seen from Formula (7), a longer trajectory can be drawn on a road surface if the virtual traveling velocity Vv is smaller. An integer that is not less than zero is used as the relative time m.

First, the traveling-trajectory drawing unit 303 obtains a drawing frame range mM (a frame) from a drawing distance range ZM (mm) using the following formula (Step 801):

$$mM=ZM/Vv \quad (8)$$

In this case, the range 0≤m<mM is an interval for drawing a traveling trajectory. Next, the traveling-trajectory drawing unit 303 sets m to zero (Step 802) and compares m with mM (Step 803). When m is less than mM (Step 803, NO), the traveling-trajectory drawing unit 303 obtains a position (Xr(m),Zr(m)) in the road-center coordinate system using Formula (6) and Formula (7) (Step 804).

Next, the traveling-trajectory drawing unit 303 perspectively projects (Xr(m),Zr(m)) onto the image-capturing surface 501, so as to obtain a position (xt(m),yt(m)) on a traveling trajectory image Pt using the following formulas (Step 805):

$$xt(m)=fx*Xr(m)/Zr(m)+x0 \quad (9)$$

$$yt(m)=fy*H/Zr(m)+y0 \quad (10)$$

(xt(m),yt(m)) is a coordinate system in which an upper left vertex of an image frame is set to be an origin, and (x0,y0) represents a central position of the image frame. Next, the traveling-trajectory drawing unit 303 plots a mark at the position (xt(m),yt(m)) on the traveling trajectory image Pt (Step 806). The mark may be a dot having a prescribed color.

Then, the traveling-trajectory drawing unit 303 increments m by one (Step 807), repeats the processes of and after Step 803, and terminates the processing when m has reached mM (Step 803, YES).

Figure 9:
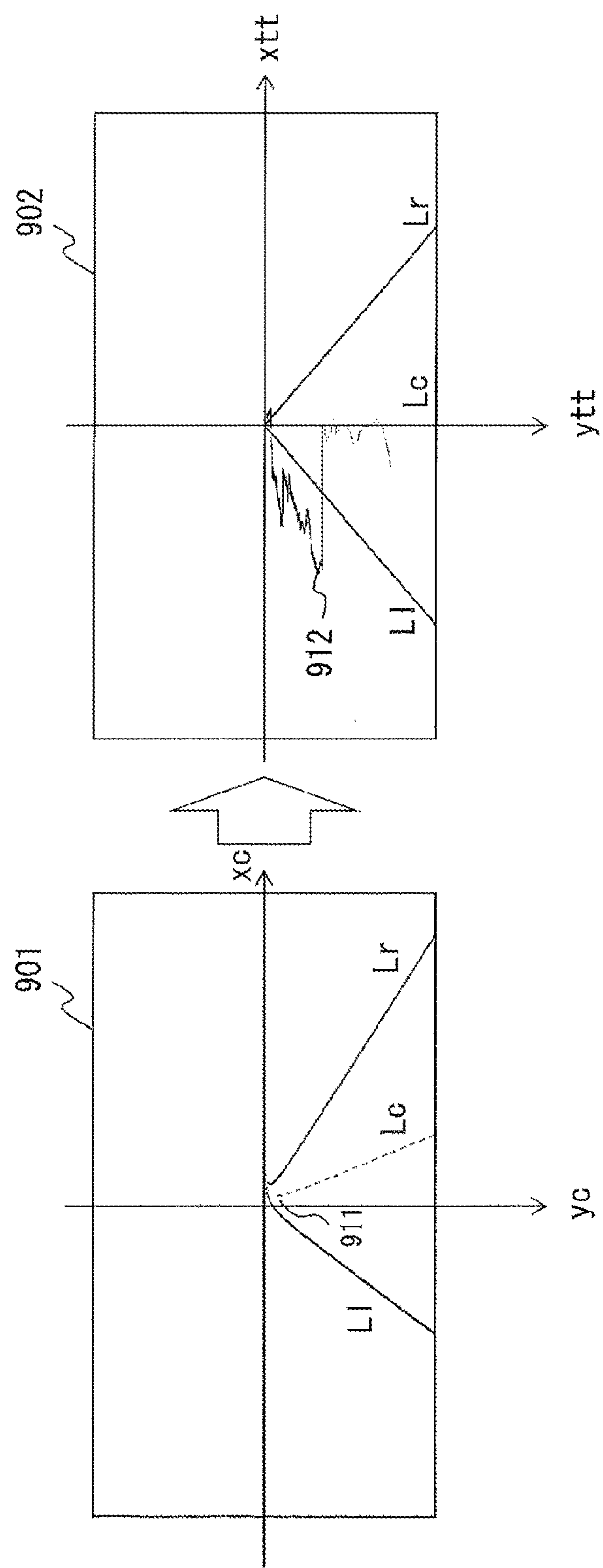
FIG. 9 illustrates a traveling trajectory image.

FIG. 9 illustrates an example of the traveling trajectory image Pt generated by performing the traveling-trajectory drawing processing of FIG. 8. On an image 901 of the image coordinate system O-xcyc, a vehicle center is fixed at a prescribed position on a yc-axis, so a traveling trajectory 911 according to an actual traveling velocity Vr is drawn as a straight line on the yc-axis.

On the other hand, on a traveling trajectory image 902 corresponding to a transformed image, a virtual central line Lc is fixed on a ytt-axis of a coordinate system (xtt,ytt) in which the position (x0,y0) is set to be an origin. Thus, a traveling trajectory 912 according to a virtual traveling velocity Vv is drawn as a displacement from the ytt-axis in an xtt-axis direction. Accordingly, a movement trajectory of a vehicle can be displayed on a road surface over a long distance, which results in emphasizing the left/right rocking of the vehicle. The virtual central line Lc, a line marking Lr, and a line marking L1 are actually included in a lane image P1 described later, and not included in the travel trajectory image Pt.

Figure 10:
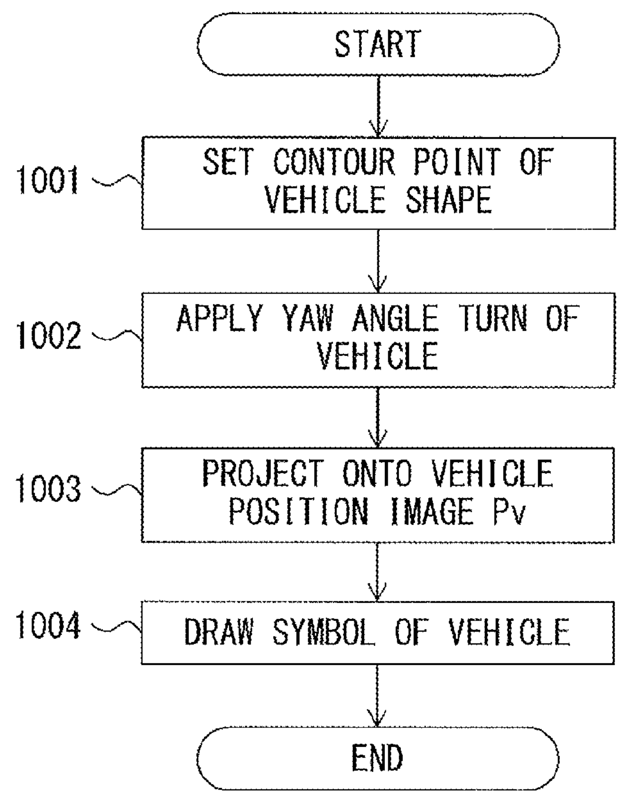
FIG. 10 is a flowchart of vehicle-position drawing processing.

FIG. 10 is a flowchart that illustrates an example of the vehicle-position drawing processing in Step 703 of FIG. 7. First, the vehicle-position drawing unit 304 sets a contour point of a vehicle shape on a road surface (Step 1001).

Figure 11:
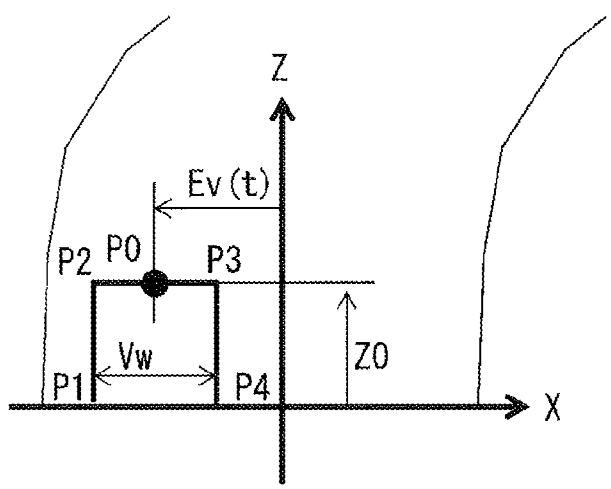
FIG. 11 illustrates contour points of a vehicle shape.

FIG. 11 illustrates examples of the contour points of the vehicle shape. Five contour points P0 to P4 in a road-center coordinate system (X, Z) are represented as follows, by use of a vehicle width Vw (mm), a depth distance Z0 (mm), and Ev(t) at the time t:

P0: (Ev(t),Z0)

P1: (Ev(t)−Vw/2,0)

P2: (Ev(t)−Vw/2,Z0)

P3: (Ev(t)+Vw/2,Z0)

P4: (Ev(t)+Vw/2,0)

From among them, the contour point P0 corresponds to a vehicle center. Next, the vehicle-position drawing unit 304 applies a yaw angle turn of a vehicle to each of the contour points (Step 1002).

Figure 12:
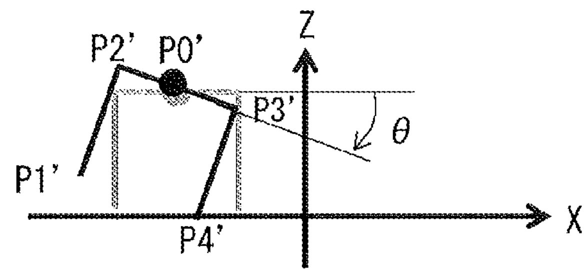
FIG. 12 illustrates a yaw angle turn of a vehicle.

FIG. 12 illustrates an example of the yaw angle turn of a vehicle. Contour points P0' to P4' respectively represent contour points obtained by applying the turn of the yaw angle θ to the contour points P0 to P4, and the contour point P0' is consistent with the contour point P0. When a coordinate of each of the contour points before the turn is (X,Z) and when Ev(t)=X0, a coordinate (X',Z') after the turn is obtained using the following formulas:

$$X' = \cos(\theta)*(X - X0) + \sin(\theta)*(Z - Z0) + X0 \quad (11)$$

$$Z' = -\sin(\theta)*(X - X0) + \cos(\theta)*(Z - Z0) + Z0 \quad (12)$$

The yaw angle θ(t) at the time t can be used as a yaw angle θ in Formula (11) and Formula (12).

Next, the vehicle-position drawing unit 304 perspectively projects the coordinate (X',Z') after the turn of each of the contour points onto the image-capturing surface 501, so as to obtain a position (xv(k),yv(k)) on a vehicle position image Pv using the following formulas (Step 1003).

$$xv(k)=fx*X'(k)/Z'(k)+x0 \quad (13)$$

$$yv(k)=fy*H/Z'(k)+y0 \quad (14)$$

(xv(k),yv(k)) is a coordinate system in which an upper left vertex of an image frame is set to be an origin. k is a variable for distinguishing between contour points, and the contour points P0 to P4 correspond to k=0 to 4, respectively.

Next, the vehicle-position drawing unit 304 draws, as a symbol indicating a vehicle, a graphic formed by the positions (xv(k),yv(k)) (k=0 to 4) on the vehicle position image Pv (Step 1004).

In the example of FIG. 12, a graphic is drawn that is formed by a point representing the contour point P0', a line connecting the contour point P1' and the contour point P2', a line connecting the contour point P2' and the contour point P3', and a line connecting the contour point P3' and the contour point P4'. A position of a vehicle is directly confirmed visually by drawing a symbol having a width that corresponds to the vehicle width Vw.

FIG. 13 illustrates an example of the vehicle position image Pv generated by performing the vehicle-position drawing processing of FIG. 10. On an image 1301 of the image coordinate system O-xcyc, a vehicle center 1311 is fixed at a prescribed position on a yc-axis, so a symbol 1312 is drawn as a graphic having its center fixed on the yc-axis.

On the other hand, on a vehicle position image 1302 corresponding to a transformed image, a virtual central line Lc is fixed on a yvv-axis of a coordinate system (xvv,yvv) in which the position (x0,y0) is set to be an origin. Thus, the symbol 1312 is drawn as a graphic having its center at a position away from the yvv-axis. This permits a direct visual confirmation of the left/right rocking of a vehicle on a road surface. The virtual central line Lc, a line marking Lr, and a line marking Ll are actually included in the lane image P1 described later, and not included in the vehicle position image Pv.

Figure 14:
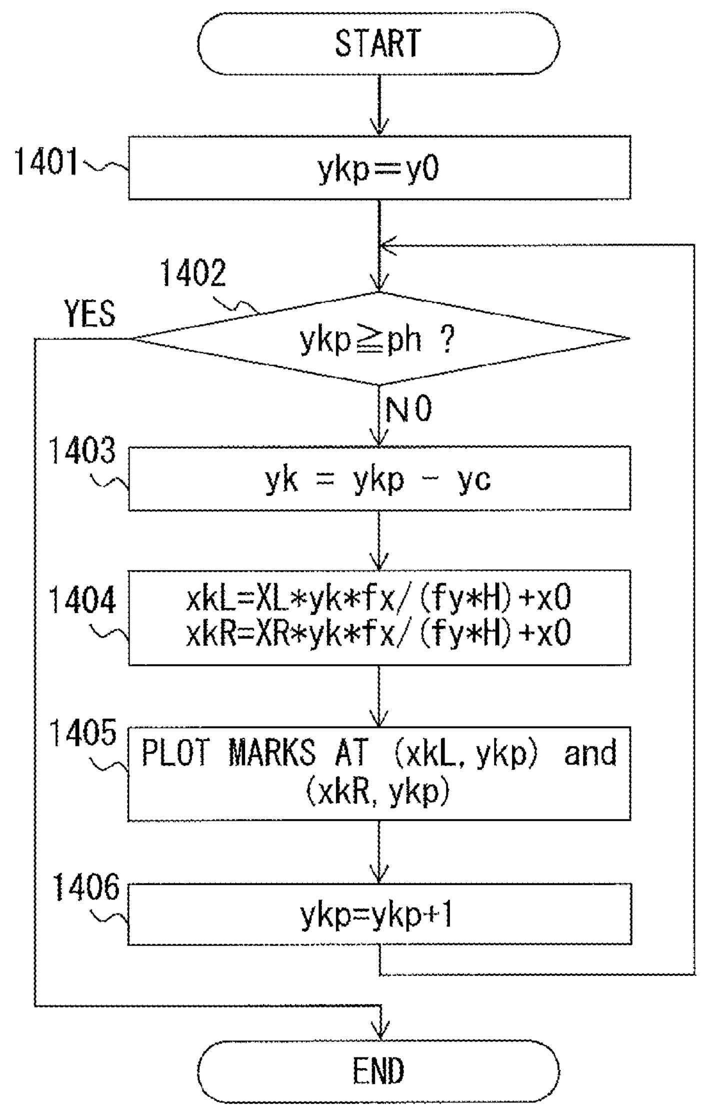
FIG. 14 is a flowchart of lane drawing processing.

FIG. 14 is a flowchart that illustrates an example of the lane drawing processing in Step 704 of FIG. 7. First, setting (x0,y0) to be a coordinate of a central position of an image frame on the lane image P1, the lane drawing unit 305 sets y0 to be a ykp coordinate of a drawing position (xkp,ykp) on the lane image P1 (Step 1401). (xkp,ykp) is a coordinate system in which an upper left vertex of the image frame is set to be an origin.

Next, the lane drawing unit 305 compares ykp with the number of pixels ph in a vertical direction (Step 1402). When ykp is less than ph (Step 1402, NO), the lane drawing unit 305 transforms ykp into yk using the following formula (Step 1403)

$$yk=ykp-y0 \quad (15)$$

yk represents a yk coordinate in a coordinate system (xk, yk) having its origin at (x0,y0). Next, using a road width W(t) at the time t, the lane drawing unit 305 obtains xkL that represents an xkp coordinate of the lane marking Ll on the left side and xkR that represents an xkp coordinate of the lane marking Lr on the right side.

$$xkL=XL*yk*fx/(fy*H)+x0 \quad (16)$$

$$xkR=XR*yk*fx/(fy*H)+x0 \quad (17)$$

$$XL=-W(t)/2 \quad (18)$$

$$XR=W(t)/2 \quad (19)$$

XL in Formula (18) represents an xk coordinate of the lane marking Ll on the left side, and XR in Formula (19) represents an xk coordinate of the lane marking Lr on the right side. Formula (16) and Formula (17) are derived on the basis of the second term on the right side of Formula (1).

Next, the lane drawing unit 305 plots marks at positions (xkL,ykp) and (xkR,ykp) on the lane image P1 (Step 1405). The marks may be dots with prescribed colors.

Then, the lane drawing unit 305 increments ykp by one (Step 1406), repeats the processes of and after Step 1402, and terminates the processing when ykp has reached ph (Step 1402, YES).

An image of a lane marking Ll and a lane marking Lr, for example, as illustrated in the traveling trajectory image 902 of FIG. 9 or in the vehicle position image 1302 of FIG. 13, is generated by performing this lane drawing processing. Accordingly, it is possible to easily visually confirm relative positions of the traveling trajectory 912 or the symbol 1312 and lane markings Ll and Lr.

Figure 15:
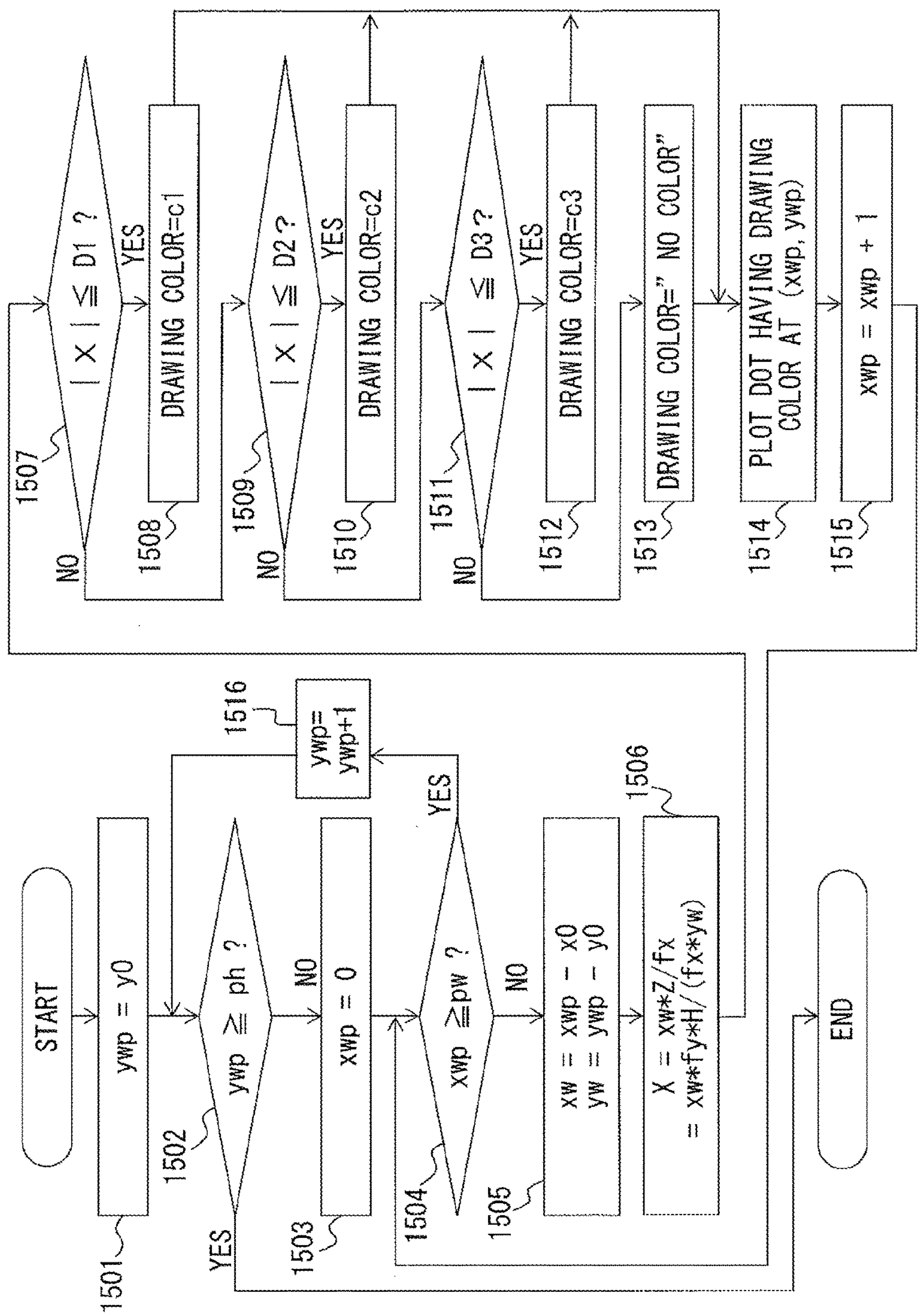
FIG. 15 is a flowchart of dangerous-range drawing processing.

FIG. 15 is a flowchart that illustrates an example of the dangerous-range drawing processing in Step 705 of FIG. 7. In the dangerous-range drawing processing of FIG. 15, areas within a traveling lane are classified into three types of areas constituted of a safe range, an attention range, and a dangerous range according to the distance from the end of the traveling lane, and a dangerous range image Pw in which these areas are indicated is generated.

Figure 16:
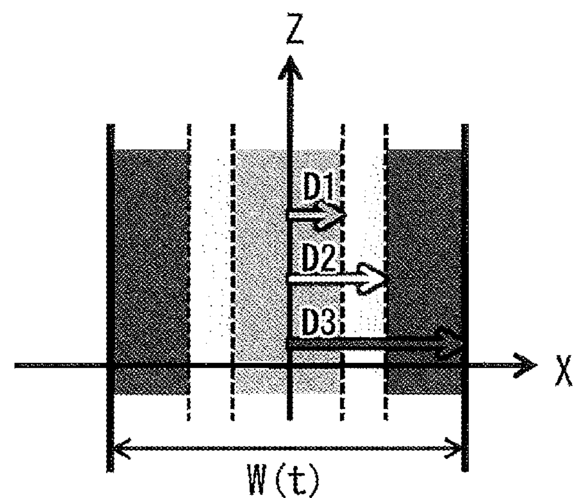
FIG. 16 illustrates a safe range, an attention range, and a dangerous range.

FIG. 16 illustrates examples of the safe range, the attention range, and the dangerous range. In FIG. 16, according to a value of an X coordinate in the road-center coordinate system (X,Z), the safe area, the attention area, and the dangerous area are set as follows:

Safe area: $|X| \le D1$

Attention area: $D1 < |X| \le D2$

Dangerous area: $D2 < |X| \le D3$

For example, thresholds of a distance D1 to D3 are obtained using the following formulas by use of a vehicle width Vw and a road width W(t) at the time t:

$$D1=(W(t)-Vw)/2-MGN \quad (20)$$

$$D2=(W(t)-Vw)/2 \quad (21)$$

$$D3=W(t)/2 \quad (22)$$

MGN in Formula (20) is a prescribed value that indicates a width of the attention area, and it may be, for example, a value about 20 cm to 30 cm.

First, setting (x0,y0) to be a coordinate of a central position of an image frame on the dangerous range image Pw, the dangerous-range drawing unit 306 sets y0 to be a ywp coordinate of a drawing position (xwp,ywp) on the dangerous range image Pw (Step 1501). (xwp,ywp) is a coordinate system in which an upper left vertex of the image frame is set to be an origin.

Next, the dangerous-range drawing unit 306 compares ywp with the number of pixels ph in a vertical direction (Step 1502). When ywp is less than ph (Step 1502, NO), the dangerous-range drawing unit 306 sets an xwp coordinate to zero (Step 1503).

Next, the dangerous-range drawing unit 306 compares xwp with the number of pixels pw in a horizontal direction (Step 1504). When xwp is less than pw (Step 1504, NO), the dangerous-range drawing unit 306 respectively transforms xwp and ywp into xw and yw using the following formulas (Step 1505)

$$xw=xwp-x0 \quad (23)$$

$$yw=ywp-y0 \quad (24)$$

(xw,yw) is a coordinate system having its origin at (x0, y0). Next, the dangerous-range drawing unit 306 transforms xw into the X coordinate in the road-center coordinate system (X,Z) using the following formula:

$$\begin{aligned} X &= xw*Z/fx \\ &= xw*fy*H/(fx*yw) \end{aligned} \quad (25)$$

Next, the dangerous-range drawing unit 306 compares an absolute value |X| of X with D1 (Step 1507). When |X| is not greater than D1 (Step 1507, YES), the dangerous-range drawing unit 306 determines that a drawing color at the position (xwp,ywp) on the dangerous range image Pw is a color c1 that represents the safe range (Step 1508).

When |X| is greater than D1 (Step 1507, NO), the dangerous-range drawing unit 306 compares |X| with D2 (Step 1509). When |X| is not greater than D2 (Step 1509, YES), the dangerous-range drawing unit 306 determines that the drawing color at the position (xwp,ywp) is a color c2 that represents the attention area (Step 1510).

When |X| is greater than D2 (Step 1509, NO), the dangerous-range drawing unit 306 compares |X| with D3 (Step 1511). When |X| is not greater than D3 (Step 1511, YES), the dangerous-range drawing unit 306 determines that the drawing color at the position (xwp,ywp) is a color c3 that represents the dangerous area (Step 1512).

When |X| is greater than D3 (Step 1511, NO), the dangerous-range drawing unit 306 determines that the drawing color at the position (xwp,ywp) is "no color" (Step 1513).

Next, the dangerous-range drawing unit 306 plots a dot having a determined drawing color at a position (xwp,ywp) on the dangerous range image Pw (Step 1514). However, when it is "no color", a dot is not plotted.

Next, the dangerous-range drawing unit 306 increments xwp by one (Step 1515) and repeats the processes of and after Step 1504. When xwp has reached pw (Step 1504, YES), the dangerous-range drawing unit 306 increments ywp by one (Step 1516) and repeats the processes of and after Step 1502. When ywp has reached ph (Step 1502, YES), the dangerous-range drawing unit 306 terminates the processing.

Figure 17:
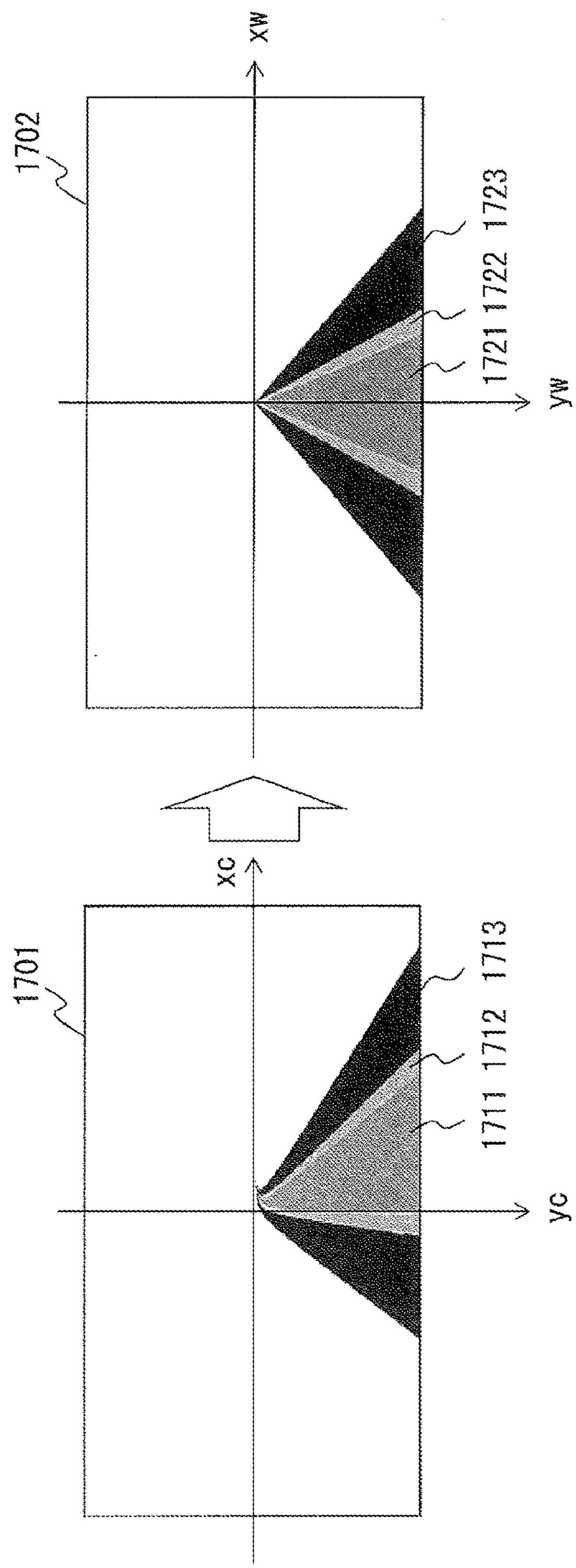
FIG. 17 illustrates a dangerous range image.

FIG. 17 illustrates an example of the dangerous range image Pw generated by performing the dangerous-range drawing processing of FIG. 15. On an image 1701 of the image coordinate system O-xcyc, a vehicle center is fixed at a prescribed position on a yc-axis, so shapes of a safe range 1711, an attention range 1712, and a dangerous range 1713 vary according to a road geometry.

On the other hand, on a dangerous range image 1702 corresponding to a transformed image, a virtual central line is fixed on a yw-axis, so shapes of a safe range 1721, an attention range 1722, and a dangerous range 1723 do not vary significantly. Accordingly, each of the ranges can be stably displayed on a road surface.

Figure 18:
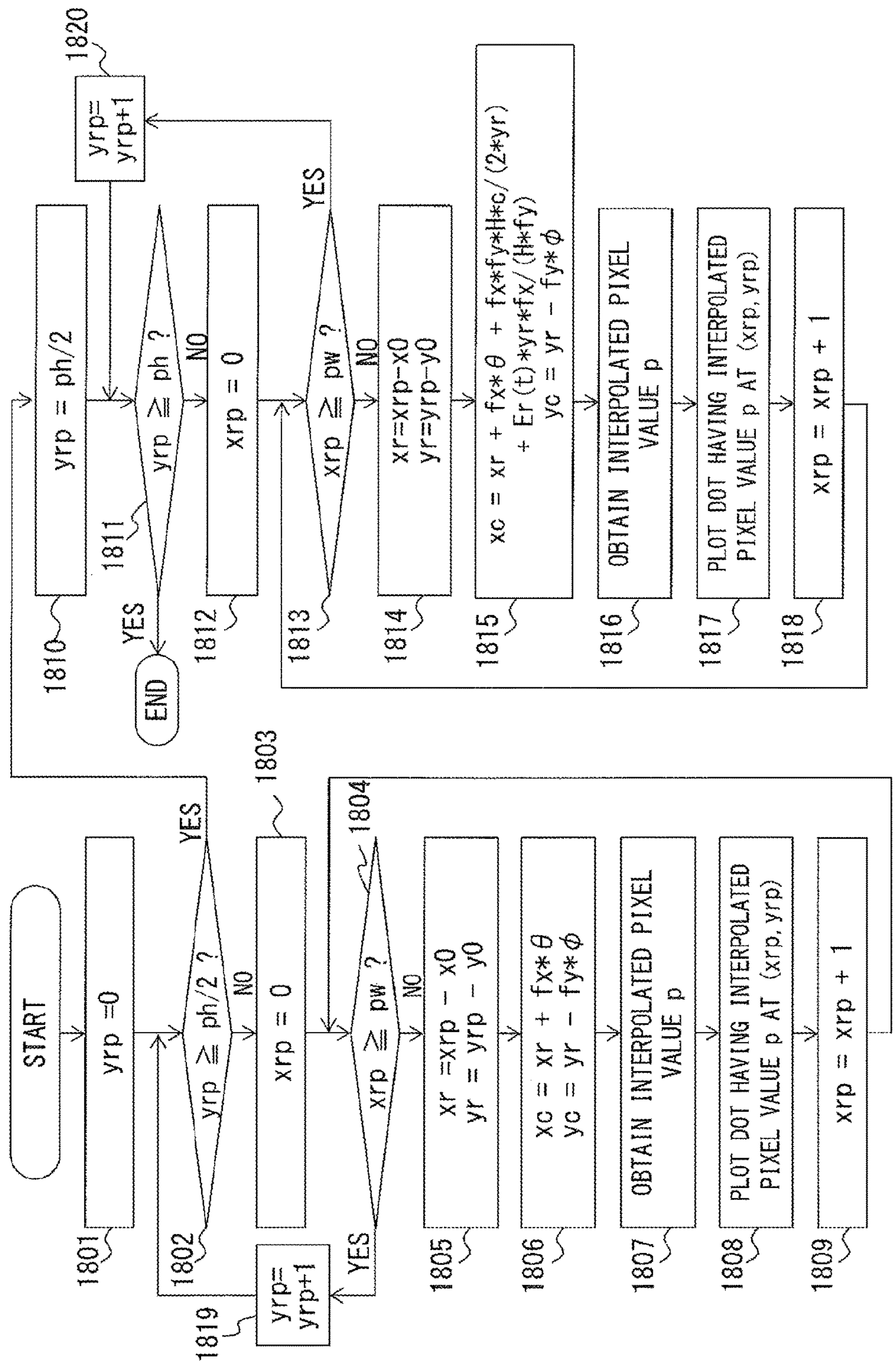
FIG. 18 is a flowchart of road-image drawing processing.

FIG. 18 is a flowchart that illustrates an example of the road-image drawing processing in Step 706 of FIG. 7. In the road-image drawing processing of FIG. 18, an image frame captured by a camera is transformed into a transformed image Pr. The transformed image Pr is represented using an image coordinate system (xrp,yrp) in which an upper left vertex of the image frame is set to be an origin. (xr,yr) is a coordinate system having its origin at the position (x0,y0) on the transformed image Pr. In this case, the transformed image Pr is generated, divided into two areas below:

Upper portion of the transformed image Pr ($yr \le 0$): background portion

Lower portion of the transformed image Pr ($yr > 0$): road surface portion

FIG. 19 illustrates an example of the road-image drawing processing. A transformed image 1901 is divided into a background portion 1911 and a road surface portion 1912. With respect to the background portion 1911, the components of a yaw angle θ and a pitch angle ϕ are corrected, and with respect to the road surface portion 1912, the components of a yaw angle θ, a pitch angle ϕ, a road curvature c(t), and a lateral distance Er(t) are corrected. With respect to the background portion 1911, there is no need for correction to the components of a road curvature c(t) and a lateral distance Er(t), and the correction can be omitted.

For a pixel 1921 having a coordinate (xr,yr) that is included in each of the portions of the transformed image 1901, a coordinate (xc,yc) of a corresponding position 1922 in an image frame 1902 is obtained. Then, an interpolated pixel value is obtained by performing interpolation by use of pixel values situated around the position 1922, and the interpolated pixel value is set to be a pixel value of the pixel 1921.

In FIG. 18, Step 1801 to Step 1809 and step 1819 correspond to processing of generating an image of the background portion, and Step 1810 to Step 1818 and Step 1820 correspond to processing of generating an image of the road surface portion.

First, the road-surface-image drawing unit 307 sets zero to a yrp coordinate of a drawing position (xrp,yrp) on the transformed image Pr (Step 1801), and compares yrp with ph/2 (Step 1802). When yrp is less than ph/2 (Step 1802, NO), the road-surface-image drawing unit 307 sets zero to an xrp coordinate (Step 1803).

Next, the road-surface-image drawing unit 307 compares xrp with pw (Step 1804). When xrp is less than pw (Step 1804, NO), the road-surface-image drawing unit 307 respectively transforms xrp and yrp into xr and yr using the following formulas (Step 1805):

$$xr=xrp-x0 \quad (31)$$

$$yr=yrp-y0 \quad (32)$$

Next, the road-surface-image drawing unit 307 obtains a coordinate (xc,yc) of a corresponding position in an image frame captured by a camera using the following formulas (Step 1806):

$$xc=xr+fx*\theta \quad (33)$$

$$yc=yr-fy*\phi \quad (34)$$

fx*θ in Formula (33) represents the component of a yaw angle θ, and fy*ϕ in Formula (34) represents the component of a pitch angle ϕ. The yaw angle θ and the pitch angle ϕ respectively correspond to the yaw angle θ(t) and the pitch angle ϕ(t) at the time t.

Next, the road-surface-image drawing unit 307 obtains an interpolated pixel value p at a coordinate (xc,yc) by performing interpolation (Step 1807). For example, when a bilinear interpolation is used, the interpolated pixel value p is obtained using the following formulas:

$$ix=\text{Integer value obtained by truncating } xc \quad (35)$$

$$iy=\text{Integer value obtained by truncating } yc \quad (36)$$

$$dx1=xc-ix \quad (37)$$

$$dx2=1-dx1 \quad (38)$$

$$dy1=yc-iy \quad (39)$$

$$dy2=1-dy1 \quad (40)$$

$$p1=Pc(ix,iy) \quad (41)$$

$$p2=Pc(ix+1,iy) \quad (42)$$

$$p3=Pc(ix,iy+1) \quad (43)$$

$$p4=Pc(ix+1,iy+1) \quad (44)$$

$$p=dy2*(dx2*p1+dx1*p2)+dy1*(dx2*p3+dx1*p4) \quad (45)$$

dx1, dx2, dy1 and dy2 in Formula (37) to Formula (40) each represent a position error in the image frame, and p1 to p4 in Formula (41) Formula (44) each represent a pixel value situated around the coordinate (xc,yc).

Next, the road-surface-image drawing unit 307 plots a dot having the interpolated pixel value p at the position (xrp,yrp) on the transformed image Pr (Step 1808).

Next, the road-surface-image drawing unit 307 increments xrp by one (Step 1809) and repeats the processes of and after Step 1804. When xrp has reached pw (Step 1804, YES), the road-surface-image drawing unit 307 increments yrp by one (Step 1819) and repeats the processes of and after Step 1802.

Then, when yrp has reached ph/2 (Step 1802, YES), the road-surface-image drawing unit 307 sets ph/2 to the yrp coordinate (Step 1810) and compares yrp with ph (Step 1811). When yrp is less than ph (Step 1811, NO), the road-surface-image drawing unit 307 sets zero to an xrp coordinate (Step 1812).

Next, the road-surface-image drawing unit 307 compares xrp with pw (Step 1813). When xrp is less than pw (Step 1813, NO), the road-surface-image drawing unit 307 respectively transforms xrp and yrp into xr and yr using Formula (31) and Formula (32) (Step 1814).

Next, the road-surface-image drawing unit 307 obtains a coordinate (xc,yc) of a corresponding position in the image frame captured by the camera using the following formulas (Step 1815):

$$xc=xr+fx*\theta+fx*fy*H*c/(2*yr)+Er(t)*yr*fx/(H*fy) \quad (46)$$

$$yc=yr-fy*\phi \quad (47)$$

In Formula (46), fx*θ represents the component of a yaw angle θ, fx*fy*H*c/(2*yr) represents the component of a road curvature c, and Er(t)*yr*fx/(H*fy) represents the component of a lateral distance E. In Formula (47), fy*ϕ represents the component of a pitch angle ϕ. The yaw angle θ, the pitch angle ϕ, and the road curvature c respectively correspond to a yaw angle θ(t), a pitch angle ϕ(t) and the road curvature c(t) at the time t. Er(t) is obtained using Formula (2).

Next, the road-surface-image drawing unit 307 obtains an interpolated pixel value p at a coordinate (xc,yc) by performing interpolation (Step 1816), and plots a dot having the interpolated pixel value p at the position (xrp,yrp) on the transformed image Pr (Step 1817).

Next, the road-surface-image drawing unit 307 increments xrp by one (Step 1818) and repeats the processes of and after Step 1813. When xrp has reached pw (Step 1813, YES), the road-surface-image drawing unit 307 increments yrp by one (Step 1820) and repeats the processes of and after Step 1811. Then, when yrp has reached ph (Step 1811, YES), the road-surface-image drawing unit 307 terminates the processing.

FIG. 20 illustrates an example of the transformed image Pr generated by performing the road-image drawing processing of FIG. 18. On an image frame 2001 of the image coordinate system O-xcyc, a vehicle center is fixed at a prescribed position on a yc-axis, so a shape of a road varies according to a left/right rocking of the vehicle.

On the other hand, on a transformed image 2002, a virtual central line Lc is fixed on a yr-axis, so a shape of a road does not vary significantly. Accordingly, a road surface image can be stably displayed.

Figure 21:
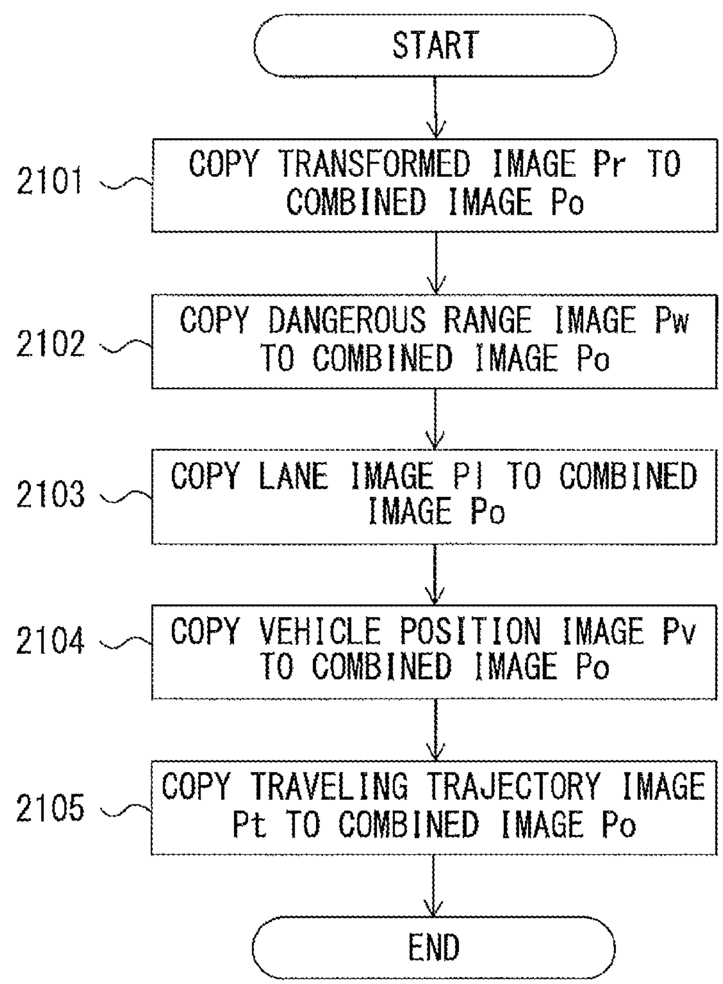
FIG. 21 is a flowchart of image combining processing.
Figure 22:
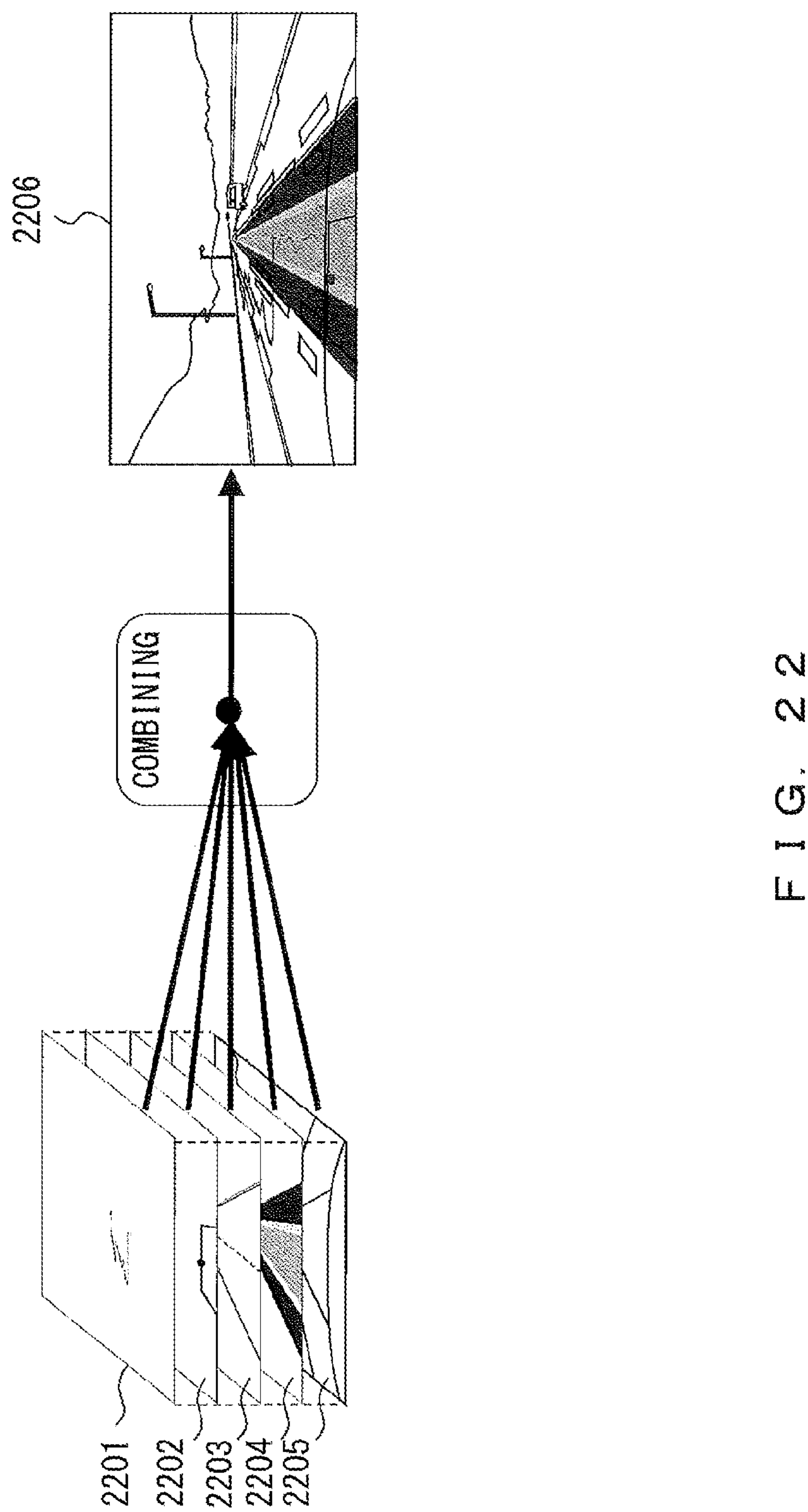
FIG. 22 illustrates the image combining processing.

FIG. 21 is a flowchart that illustrates an example of the image combining processing in Step 707 of FIG. 7. In the image combining processing of FIG. 21, as illustrated in FIG. 22, a combined image 2206 is generated from five planes of images that are a traveling trajectory image 2201, a vehicle position image 2202, a lane image 2203, a dangerous range image 2204, and a transformed image 2205. The traveling trajectory image 2201 corresponds to the top plane, and the transformed image 2205 corresponds to the bottom plane. The combination unit 302 integrates the five planes of images by overwriting their pixels having a drawing color one another in order from the bottom plane to the top plane, so as to display the five planes of images superimposed over one another as the combined image 2206.

First, the combination unit 302 copies a transformed image Pr to a combined image Po (Step 2101), and copies, to the combined image Po, a pixel value of a pixel having a drawing color in the dangerous range image Pw (Step 2102). Next, the combination unit 302 copies, to the combined image Po, a pixel value of a pixel corresponding to a mark in the lane image P1 (Step 2103), and copies, to the combined image Po, a pixel value of a pixel corresponding to a symbol in the vehicle position image Pv (Step 2104). Then, the combination unit 302 copies, to the combined image Po, a pixel value of a pixel corresponding to a mark in the traveling trajectory image Pt (Step 2105).

Figure 23B:
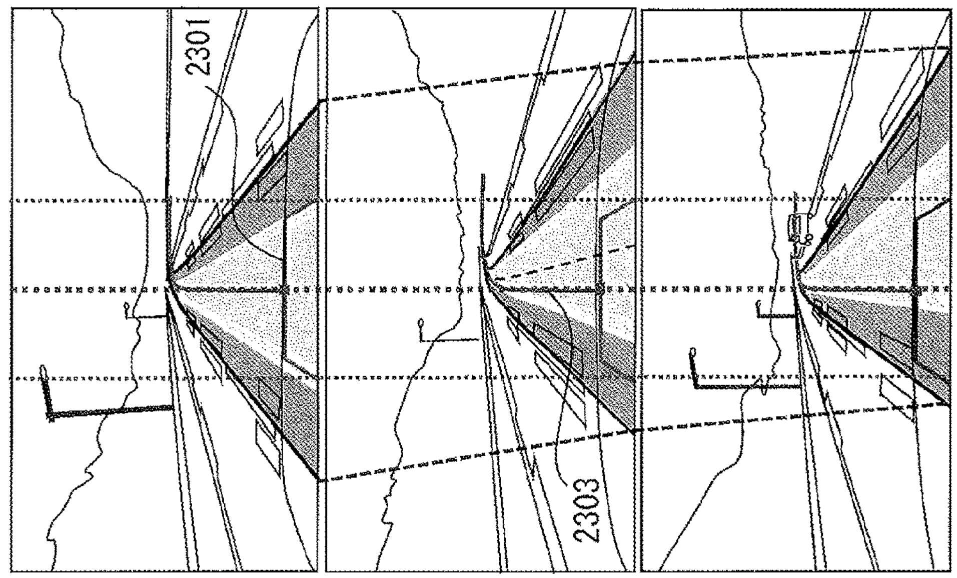
FIGS. 23A and 23B illustrate combined images.
Figure 23A:
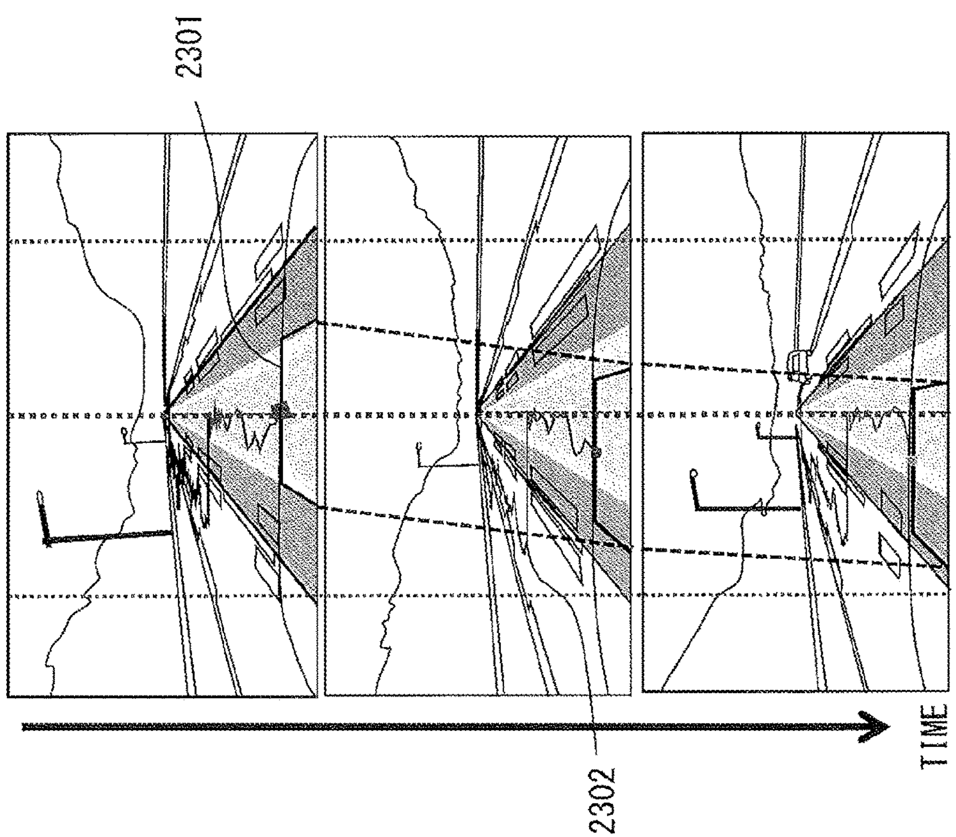

FIGS. 23A and 23B illustrate an example of a combined image Po generated by performing the image combining processing of FIG. 21. In the combined image of FIG. 23A, a road surface is fixed, there is an actual scene change, a symbol 2301 indicating a vehicle rocks from side to side, and a traveling trajectory 2302 is compressed in a traveling direction. As a result, the road surface and the traveling trajectory are fixed and only the vehicle rocks from side to side, and the traveling trajectory is emphasized, which permits an easy visual confirmation of a wobble state of the vehicle. For example, when a video of a traveling vehicle that has been recorded by a drive recorder is confirmed, it is also possible to easily confirm a future trajectory change during the travel of the vehicle.

On the other hand, in the image frame of the image coordinate system O-xcyc illustrated in FIG. 23B, the symbol 2301 indicating a vehicle is fixed, the entirety of a road surface rocks from side to side, and a traveling trajectory 2303 is limited to a portion of a closer side. Thus, a larger area of the road surface rocks and it is difficult to confirm a wobble state of the vehicle, with the result that it is very difficult to confirm the wobble state using the traveling trajectory.

Instead of combining all of the traveling trajectory image, the vehicle position image, the lane image, the dangerous range image, and the transformed image, the combination unit 302 may only combine some of the images selectively so as to generate a transformed image. For example, the combination unit 302 may only combine the vehicle position image and the transformed image, or it may only combine the traveling trajectory image, the vehicle position image, and the transformed image.

The configurations of the traveling-state display device 101 of FIGS. 1 and 3 are merely examples and some of the components may be omitted or changed according to the applications or the requirements of the traveling-state display device 101. For example, when a device external to the traveling-state display device 101 estimates a road geometry parameter at each time, the estimation unit 301 can be omitted.

When the traveling trajectory image, the vehicle position image, the lane image, the dangerous range image, or the transformed image is not used for display, the traveling-trajectory drawing unit 303, the vehicle-position drawing unit 304, the lane drawing unit 305, the dangerous-range drawing unit 306, or the road-surface-image drawing unit 307 can be omitted.

The flowcharts of FIGS. 7, 8, 10, 14, 15, 18, and 21 are merely examples and some of the processes may be omitted or changed according to the configurations or the requirements of the traveling-state display device 101. For example, when a device external to the traveling-state display device 101 estimates a road geometry parameter at each time, the process of Step 701 can be omitted.

When the traveling trajectory image, the vehicle position image, the lane image, the dangerous range image, or the transformed image is not used for display, the process of Step 702, Step 703, Step 704, Step 705, or Step 706 can be omitted in FIG. 7.

The road geometry model of FIG. 4, the observation system model of FIG. 5, and the road-center coordinate system (X,Z) of the FIGS. 11, 12, and 16 are merely examples, and other models or coordinate systems may be used for performing the traveling-state display processing. Formula (1) to Formula (47) are merely examples and other formulas or coordinate systems may be used for performing the traveling-state display processing.

The traveling trajectory image of FIG. 9, the vehicle position image of FIG. 13, the dangerous range image of FIG. 17, the transformed image of FIG. 20, and the combined images of FIGS. 22, 23A, and 23B are merely examples, and other images may be used according to the configurations or the requirements of the traveling-state display device 101. For example, in the traveling trajectory image of FIG. 9 and the combined images of FIGS. 22, 23A, and 23B, a mark having another shape may be plotted so as to draw a traveling trajectory, and in the vehicle position image of FIG. 13 and the combined images of FIGS. 22, 23A, and 23B, a symbol having another size or shape may be drawn.

FIG. 24 is a diagram that illustrates an example of a configuration of an information processing device (computer) for realizing the traveling-state display device 101 illustrated in FIGS. 1 and 3. The information processing device in FIG. 24 includes a central processing unit (CPU) 2401, a memory 2402, an input device 2403, an output device 2404, an auxiliary storage 2405, a medium driving device 2406, and a network connecting device 2407. These components are connected to one another via a bus 2408.

The memory 2402 is, for example, a semiconductor memory such as a read only memory (ROM), a random access memory (RAM), and a flash memory, and stores therein a program and data used for performing the traveling-state display processing. The memory 2402 can be used as the storage 111 of FIGS. 1 and 3.

For example, the CPU 2401 (processor) operates as the display controller 112 of FIGS. 1 and 3 by executing the program by use of the memory 2402. The CPU 2401 also operates the estimation unit 301, the combination unit 302, the traveling-trajectory drawing unit 303, the vehicle-position drawing unit 304, the lane drawing unit 305, the dangerous-range drawing unit 306, and the road-surface-image drawing unit 307 of FIG. 3.

The input device 2403 is, for example, a keyboard or a pointing device, and is used for inputting instructions or information from a user or an operator. The output device 2404 is, for example, a display, a printer, or a speaker, and is used for outputting inquiries or instructions to the user or the operator, or outputting a result of processing. The result of processing may be a combined image.

The auxiliary storage 2405 is, for example, a magnetic disk device, an optical disk device, a magneto-optical disk device, or a tape device. The auxiliary storage 2405 may be a hard disk drive or a flash memory. The information processing device stores the program and the data in the auxiliary storage 2405 so as to load them into the memory 2402 and use them. The auxiliary storage 2405 can be used as the storage 111 of FIGS. 1 and 3.

The medium driving device 2406 drives a portable recording medium 2409 so as to access the recorded content. The portable recording medium 2409 is, for example, a memory device, a flexible disk, an optical disc, or a magneto-optical disk. The portable recording medium 2409 may be, for example, a compact disk read only memory (CD-ROM), a digital versatile disk (DVD), or a universal serial bus (USB) memory. The user or the operator can store the program and the data in the portable recording medium 2409 so as to load them into the memory 2402 and use them.

As described above, a computer-readable recording medium that stores therein a program and data used for the traveling-state display processing is a physical (non-transitory) recording medium such as the memory 2402, the auxiliary storage 2405, and the portable storage medium 2409.

The network connecting device 2407 is a communication interface that is connected to a communication network such as a local area network or a wide area network and makes a data conversion associated with communication. The information processing device can receive the program and the data from an external device via the network connecting device 2407 so as to load them into the memory 2402 and use them. The information processing device can also receive a processing request from a user terminal, perform the traveling-state display processing, and transmit a combined image to the user terminal via the network connecting device 2407.

The information processing device does not necessarily include all the components in FIG. 24, and some of the components can be omitted according to the applications or the requirements. For example, when the information processing device receives a processing request from the user terminal via the communication network, the input device 2403 and the output device 2404 may be omitted. Further, when the portable recording medium 2409 or the communication network is not used, the medium driving device 2406 or the network connecting device 2407 may be omitted, respectively.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a traveling-state display program causing a computer to execute a process comprising:

detecting a virtual central line of a traveling lane from a road-captured image captured from a vehicle; and displaying a transformed image generated by transforming the road-captured image such that the detected virtual central line is situated in a prescribed position, and moving a display position of a symbol indicating the vehicle on the generated transformed image according to a result of detecting a traveling position of the vehicle in the traveling lane, wherein the computer executes, on a plurality of image frames in a moving image, the detecting the virtual central line and the moving the display position of the symbol indicating the vehicle, and the process further comprises:

determining a first coordinate value in a direction perpendicular to the virtual central line on the basis of a magnitude of a shift between the virtual central line and the display position of the symbol indicating the vehicle in each of the plurality of image frames, and determining a second coordinate value in a direction of the virtual central line on the basis of an order of frames with respect to a specific image frame from among the plurality of image frames; and plotting a mark at a position in the specific image frame, the position being identified by the first coordinate value and the second coordinate value that are determined with respect to each of the image frames after the specific image frame from among the plurality of image frames.

2. The non-transitory computer-readable recording medium according to claim 1, wherein the symbol has a width that corresponds to a vehicle width of the vehicle.

3. The non-transitory computer-readable recording medium according to claim 1, wherein the determining the first coordinate value and the second coordinate value determines the first coordinate value and the second coordinate value by using a perspective transformation.

4. The non-transitory computer-readable recording medium according to claim 1, wherein the determining the second coordinate value determines the second coordinate value by compressing a distance in the direction of the virtual central line.

5. The non-transitory computer-readable recording medium according to claim 1, wherein the determining the first coordinate value and the second coordinate value determines the first coordinate value and the second coordinate value when the traveling lane is made straight.

6. The non-transitory computer-readable recording medium according to claim 1, wherein the computer executes generating the transformed image only on a road surface portion in the road-captured image.

7. The non-transitory computer-readable recording medium according to claim 1, wherein the process further comprises classifying, according to a distance from an end of the traveling lane, areas within the traveling lane into a plurality of areas so as to display the plurality of areas superimposed over the transformed image.

8. The non-transitory computer-readable recording medium according to claim 1, wherein the road-captured image is an image that is captured by a wide-angle lens from the vehicle, and the computer executes generating the transformed image by performing a perspective transformation on the road-captured image and arranging a point at infinity at an image center.

9. The non-transitory computer-readable recording medium according to claim 1, wherein the road-captured image and the moving image are captured by a camera mounted on the vehicle.

10. A traveling-state display device comprising:

a memory that stores therein a road-captured image captured from a vehicle; and a processor that detects a virtual central line of a traveling lane from the road-captured image, displays a transformed image generated by transforming the road-captured image such that the detected virtual central line is situated in a prescribed position, and moves a display position of a symbol indicating the vehicle on the generated transformed image according to a result of detecting a traveling position of the vehicle in the traveling lane, wherein the processor executes, on a plurality of image frames in a moving image, a process of detecting the virtual central line and a process of moving the display position of the symbol indicating the vehicle, determines a first coordinate value in a direction perpendicular to the virtual central line on the basis of a magnitude of a shift between the virtual central line and the display position of the symbol indicating the vehicle in each of the plurality of image frames, and determines a second coordinate value in a direction of the virtual central line on the basis of an order of frames with respect to a specific image frame from among the plurality of image frames, and plots a mark at a position in the specific image frame, the position being identified by the first coordinate value and the second coordinate value that are determined with respect to each of the image frames after the specific image frame from among the plurality of image frames.

11. The traveling-state display device according to claim 10, wherein the symbol has a width that corresponds to a vehicle width of the vehicle.

12. A traveling-state display method comprising:

detecting, by a processor, a virtual central line of a traveling lane from a road-captured image captured from a vehicle;

displaying, by the processor, a transformed image generated by transforming the road-captured image such that the detected virtual central line is situated in a prescribed position and moving, by the processor, a display position of a symbol indicating the vehicle on the generated transformed image according to a result of detecting a traveling position of the vehicle in the traveling lane;

executing, on a plurality of image frames in a moving image, the detecting the virtual central line and the moving the display position of the symbol indicating the vehicle;

determining a first coordinate value in a direction perpendicular to the virtual central line on the basis of a magnitude of a shift between the virtual central line and the display position of the symbol indicating the vehicle in each of the plurality of image frames, and determining a second coordinate value in a direction of the virtual central line on the basis of an order of frames with respect to a specific image frame from among the plurality of image frames; and plotting a mark at a position in the specific image frame, the position being identified by the first coordinate value and the second coordinate value that are determined with respect to each of the image frames after the specific image frame from among the plurality of image frames.

13. The traveling-state display method according to claim 12, wherein the symbol has a width that corresponds to a vehicle width of the vehicle.

* * * * *